United States Patent
Wallen et al.

(10) Patent No.: US 7,010,544 B2
(45) Date of Patent: Mar. 7, 2006

(54) METHOD AND SYSTEM FOR CAPTURING, MANAGING AND DISSEMINATING MANUFACTURING KNOWLEDGE

(75) Inventors: Todd Alan Wallen, Auburn, WA (US); William Eric Ward, Issaquah, WA (US); Gerald P. LaChapelle, Gig Harbor, WA (US)

(73) Assignee: Vykor, Inc., Renton, WA (US)

( * ) Notice: Subject to any disclaimer, the term of this patent is extended or adjusted under 35 U.S.C. 154(b) by 0 days.

(21) Appl. No.: 10/953,809

(22) Filed: Sep. 28, 2004

(65) Prior Publication Data

US 2005/0038821 A1     Feb. 17, 2005

Related U.S. Application Data

(63) Continuation of application No. 10/063,802, filed on May 14, 2002, now Pat. No. 6,823,342.

(60) Provisional application No. 60/291,298, filed on May 15, 2001.

(51) Int. Cl.
    *G06F 17/30*     (2006.01)
(52) U.S. Cl. .............. 707/102; 707/3; 707/4; 707/6; 707/10; 707/104.1
(58) Field of Classification Search .......... 707/10, 707/102, 104.1, 2, 3, 4, 6, 8; 704/1; 382/149; 700/97, 98, 100, 182
    See application file for complete search history.

(56) References Cited

U.S. PATENT DOCUMENTS

| | | | |
|---|---|---|---|
| 5,485,610 A | | 1/1996 | Gioielli et al. ............... 707/102 |
| 5,499,366 A | | 3/1996 | Rosenberg et al. ............ 707/4 |
| 5,526,517 A | * | 6/1996 | Jones et al. ..................... 707/8 |
| 5,539,652 A | * | 7/1996 | Tegethoff ...................... 703/14 |
| 5,649,200 A | | 7/1997 | Leblang et al. ............. 717/122 |
| 5,740,425 A | * | 4/1998 | Povilus ....................... 707/100 |
| 5,748,943 A | | 5/1998 | Kaepp et al. .................. 703/1 |
| 5,822,206 A | * | 10/1998 | Sebastian et al. ............. 700/97 |
| 5,826,257 A | | 10/1998 | Snelling, Jr. .................... 707/4 |
| 5,864,875 A | * | 1/1999 | Van Huben et al. ........ 707/200 |
| 5,963,939 A | * | 10/1999 | McCann et al. ................ 707/4 |
| 5,970,490 A | | 10/1999 | Morgenstern ................ 707/10 |
| 6,212,441 B1 | * | 4/2001 | Hazama et al. ............... 700/98 |
| 6,223,171 B1 | | 4/2001 | Chaudhuri et al. ............ 707/2 |
| 6,249,714 B1 | * | 6/2001 | Hocaoglu et al. ............. 700/97 |
| 6,295,513 B1 | | 9/2001 | Thackston ..................... 703/1 |
| 6,411,862 B1 | * | 6/2002 | Hazama et al. ............. 700/182 |
| 6,415,196 B1 | * | 7/2002 | Crampton et al. .......... 700/100 |
| 6,483,938 B1 | * | 11/2002 | Hennessey et al. ......... 382/149 |
| 6,532,464 B1 | * | 3/2003 | Miyamoto .................... 707/10 |

(Continued)

OTHER PUBLICATIONS

Hardwick et al., "Using a relational database as an index to a distributed object database in engineering design systems", IEEE, 1989, PP. 4-11.*

(Continued)

*Primary Examiner*—Thuy N. Pardo
(74) *Attorney, Agent, or Firm*—Fenwick & West LLP

(57) ABSTRACT

An independent method for configuring and extracting detailed manufacturing knowledge for fabricating an object, tool or part and storing the data to a data file or data structure. The method includes extracting design criteria from a data file and parsing criteria into elemental manufacturing building modules independent of the data file and storing the captured criteria data file. Additional manufacturing knowledge is then inputted into the meta-data file not contained in the data file by extracting manufacturing knowledge from a database housing manufacturing knowledge and incorporating this knowledge into data file which is capable of being translated to Numerical Control machine language.

2 Claims, 19 Drawing Sheets

Example MDF Structure

U.S. PATENT DOCUMENTS

2001/0047251 A1  11/2001  Kemp ............................ 703/1
2001/0047509 A1  11/2001  Mason et al. .................. 716/18
2002/0198697 A1* 12/2002  Datig ............................. 704/1

OTHER PUBLICATIONS

Biliris, "A data model for engineering design objects", IEEE, 1989, pp. 49-58.*

Caselli et al., "Using semantic data models in knowledge-based manufacturing-workcell design", IEEE, 1990, pp. 966-971.*

Vaishnavi et al., "A data/knowledge paradigm for the modeling and design of operations support systems", IEEE, 1997, pp. 275-291.*

Cumbi et al., "Development Of An Object-Oriented Knowledge-Based System For Power Electronic Circuit Design," IEEE, 1996, pp. 393-404.

International Search Report, PCT/US02/15564, Aug. 12, 2002, 5 pages.

* cited by examiner

MDF – Manual Operation Section

| Attribute | Data Type | Description |
|---|---|---|
| Manual Operation Description | Text | User entered text describing the manual operation |
| Manual Operation Name | Text | User entered name for the operation |
| Manual Operation Identification Number | Real | Internal identification numbe r |
| Manual Operation Type | List | Manual Machining, Stock Preparation, Machine Setup,... |
| Manual Operation Planned Start Date | Date | Planned start date |
| Manual Operation Actual Start Date | Date | Actual start date |
| Manual Operation Planned Completion Date | Date | Planne d completion date |
| Manual Operation Actual Completion Date | Date | Actual completion date |
| Current Percentage Complete | Real | Between 0 - 100% to indicate current status |
| Schedule Status Description | Text | User text field for current part status |

Fig. 14

MDF – QA Section

| Attribute | Data Type | Description |
|---|---|---|
| QA Section Description | Text | User entered text describing the manual operation |
| QA Section Owner | Text | Assigned owner of the QA section |
| QA Section Version | Text | Version number for the QA section, including the management of past version to track history |
| QA Section Version Description | Real | Description of the version, managed with the version number |
| QA Section Version Date | Date | Date the new version was created |
| QA Section Identification Number | Real | Tracking number for the QA Section |
| QA Section Name | Text | User assigned name for the section |
| QA Method | List | Manual / CMM / On -machine |
| Probe Type | List | TBD |
| Probe Identification Number | Real | Internal tracking number for the probe |
| Probe Manufacturer | Text | Name of the firm that manuf actures the probe |
| Probe Reference Number | Real | Manufactures identification number for the probe |
| Inspection Criteria | Text | Description of inspection point location and matrix requirements |
| Number of Inspection Points | Integer | Number of inspection points in this QA Section |
| Feature Group | Text | The names of the features that the QA Section os addressing |
| QA Section Planned Start Date | Date | Planned start date |
| QA Section Actual Start Date | Date | Actual start date |
| QA Section Planned Completion Date | Date | Planned c ompletion date |
| QA Section Actual Completion Date | Date | Actual completion date |
| Current Percentage Complete | Real | Between 0 - 100% to indicate current status |
| Schedule Status Description | Text | User text field for current part status |

Fig. 15

MDF – NC Setup Section

| Attribute | Data Type | Description |
|---|---|---|
| NC Setup Description | Text | User text entry describing the entire NC setup |
| NC Setup Owner | Text | Assigned owner of the setup |
| NC Setup Version | Real | Version number for the setup, including the management of past version to tr ack history |
| NC Setup Version Description | Text | Description of the version, managed with the version number |
| NC Setup Version Date | Date | The date the new version was created |
| NC Setup Identification Number | Real | Tracking number for the setup |
| NC Setup Name | Text | User defined name of setup |
| NC Setup Type | List | Rough, finish, rough/finish |
| NC Setup Description | Text | Text by the user describing the setup |
| Machine Identifier | Text | i.e. "North End Gantry Group" |
| Machine Group Identifier | Text | Machine 37 |
| Machine Manuf acture | Text | Name of machine tool manufacture |
| Machine Type | List | Gantry, Rotary Table, Extrusion Mill... |
| Spindle Orientation | List | Horizontal / Vertical |
| Machine Controller | Text | Controller manufacture |
| Machine Specification – Spindle Speed | Real | Required or maximum spindle speed |
| Machine Specification – Machine Envelope – X | Real | X dimension of the machine envelope |
| Machine Specification – Machine Envelope – Y | Real | Y dimension of the machine envelope |
| Machine Specification – Machine Envelope – Z | Real | Z dimensi on of the machine envelope |
| Machine Specification – Horse Power | Real | Required or maximum horse power |
| Machine Specification – Positional Tolerance | Real | Required or actual positional tolerance of the machine |
| Machine Specification Positional Tolerance Dis tance | Tol / Dist. | The distance from the home position that the positional tolerance is appropriate |
| Machine Specification – Axis Rotation in A | Real | The machines "A axis" rotation capability from normal possible for the machine. |
| Machine Specification – A xis Rotation in B | Real | The machines "B axis" rotation capability from normal possible for the machine. |
| Machine Specification – Axis Rotation in C | Real | The machines "C axis" rotation capability from normal possible for the machine. |
| Machine Specification – Machine Home | Point | The machines "home" location |
| Machine Specification – Tool Change Position | Point | The x,y,z, location of the machine where tool changes take place |
| Machine Specification – Tool Change Orientation | Real | The orientation of the machine durin g a tool change |
| Machine Specification – Start Sequence | Text | Machine unique commands necessary for machine start |
| Machine Specification – End Sequence | Text | Machine unique commands necessary for machine stop |
| Machine Specification – Tool Change Requirement Sequence | Text | Machine unique commands necessary for tool change sequences |
| Machine Specification – Tool Management Type | List | Manual, Tool Chain |
| Machine Specification – Number of Spindles | Integer | Number of spindle active on the machine |
| Machine Specific ation – Tool Chain Pockets | Integer | Number of pockets in the tool chain |
| Tool Chain Cutter Assembly Management | Array | Definition of which cutting tool assigned within the entire NC Operation Section are in which pocket of the tool chain |
| NC Setup Planned S tart Date | Date | Planned start date |
| NC Setup Actual Start Date | Date | Actual start date |
| NC Setup Planned Completion Date | Date | Planned completion date |
| NC Setup Actual Completion Date | Date | Actual completion date |

Fig. 16

MDF – Post Operation Section

| Attribute | Data Type | Description |
|---|---|---|
| Post Operation Description | Text | User entered text describing the Post Operation |
| Post Operation Owner | Text | Assigned owner of the Post Operation Section |
| Post Operation Version | Real | Version number for the Post Operation Se ction, including the management of past version to track history |
| Post Operation Version Description | Text | Description of the version, managed with the version number |
| Post Operation Version Date | Date | The date the version was created |
| Post Operation Identi fication Number | Real | Tracking number for the Post Operation Section |
| Post Operation Name | Text | User assigned name for the section |
| Post Operation Type | List | Heat Treat / Chemical Processing / Plating… |
| Post Operation Sub Type | List | Dependant on Type |
| Post O peration Specification | Text | |
| Masking Required | Boolean | Is masking required for a post process |
| Masking Type | Text | The type of masking required |
| Masking Percentage | Real | The Percentage of the part to be masked |
| Post Operation Planned Start Date | Date | Planned start date |
| Post Operation Actual Start Date | Date | Actual start date |
| Post Operation Planned Completion Date | Date | Planned completion date |
| Post Operation Actual Completion Date | Date | Actual completion date |
| Current Percentage Complete | Real | Between 0 - 100% to indicate current status |
| Schedule Status Description | Text | User text field for current part status |

Fig. 17

MDF – Cutting Assembly Definition

| Attribute | Data Type | Description |
| --- | --- | --- |
| Cutting Assembly Description | Text | User entered text describing the Post Operation |
| Cutting Tool Identifier | Text | Site specific tracking id of the tool assembly |
| Cutting Tool Definition Name | Text | Name of the cutting tool asse mbly |
| Cutting Tool Manufacturer | Text | Name of the cutting tool manufacture |
| Manufacturers Reference Number | Text | Manufactures reference number |
| Type of Cutting Tool | List | End Mill / Drill / Face Mill / Plunge Mill /... |
| Holder Type | Text | General type of the hol der (e.g. CAT or DIN) |
| Holder Taper | Real | Degree of taper in the holder |
| Holder Identifier | Text | Tracking number for the holder |
| Cutting Tool Assembly Identifier | Text | Identifier for the entire cutting tool assembly |
| Cutting Tool Assembly Name | Text | Name of the entire cutting tool assembly |
| Special Cutter | Boolean | Yes / No |
| Special Cutter Cross Section | Array | 2- d cross section of the special cutter |
| Cutting Tool Diameter | Real | Diameter of cutting tool (if applicable) |
| Cutting Tool Corner Radius | Real | Radius of the cutting tool (if applicable) |
| Cutting Tool Number of Flutes | Integer | Number of flutes in the cutting tool (if applicable) |
| Cutting Tool Alpha Angle | Real | Alpha angle for the cutter |
| Cutting Tool Beta Angle | Real | Beta angle for the cutter |
| Cutting Tool Sha nk Diameter | Real | Diameter of the cutter shank |
| Cutting Tool Set Length | Real | Length of the tool stickout |
| Cutting Tool Flute Length | Real | Length of the cutter that can be utilized in a cutting action |
| Cutting Tool Coating | List | Type of coating applied to the cutter |
| Insertable Cutting Tool | Boolean | Is the cutter an insertable cutter or not – Yes / No |
| Insertable Cutting Tool Type | List | Monolithic, Manual |
| Insert Identifier | Text | Tracking number for the insert type |
| Insert Name | Text | Name of the insert |
| Insert Man ufacture | Text | Manufacture of the insert |
| Tool Stick -out | Real | Distance from the tool tip to the start of the holder |
| Base Feed Rate | Real | Federate standard for the cutting tool assembly (this can be overridden either higher or lower within each NC action) |
| Base Spindle Speed | Real | Spindle speed standard for the cutting tool assembly (this can be overridden either higher or lower within each NC action) |

Fig. 18

MDF – NC Action

| Attribute | Data Type | Description |
|---|---|---|
| Description | Text | User entered text describing the Post Operation |
| NC Action Identifier | Text | Internal tracking number of the NC Action |
| NC Action Name | Text | User assigned name of the NC Action |
| Operation Type | List | Extruded V olume, Cylinder Volume, Void Volume, Swept Volume, Offset Volume |
| Feature Group | Text | Name of the feature group associated with the NC action |
| Feature Type | List | Type of feature in the feature group |
| Action Type | List | Rough, Finish Floor, Finish Walls, |
| CA M Operation Identifier | Real | Pointer to CAM operation |
| Feedrate Override Percentage | Percentage | Percentage to override the base federate for the cutting assembly |
| Spindle Speed Override | Percentage | Percentage to override the base spindle speed for the cuttin g assembly |
| Depth of Cut | Real | Depth of each cut level |
| Wall Offset | Real | Offset from the wall for an NC operation (or amount of material left on the wall after the operation is complete) |
| Floor Offset | Real | Offset from the floor for an NC operation (or amoun t of material left on the floor after the operation is complete) |
| Corner Slow Down | Boolean | Flag to indicate whether to slow down during corner cutting |
| Corner Slow Down Percentage | Percentage | The percentage to slow the federate in the corner |
| Level Transiti on Type | List | Plunge, Ramp, Helical, Pre -drill |
| Toolpath Type | List | Helical, Back -and- Forth, One -Way |
| Cutting Type | List | Climb or Conventional |

Fig. 19

MDF – QA Action

| Attribute | Data Type | Description |
|---|---|---|
| Description | Text | User entered text describing the Post Operation |
| QA Action Identification Number | Real | Internal tracking number of the QA Action |
| QA Action Name | Text | User assigned name of the QA Action |
| QA Operation Type | List | Manual / Machine Probing |
| Feature Group | Text | Name of the feature group associated with the QA action |
| Feature Type | List | Type of feature in the feature group |
| Action Type | List | Rough, Finish Floor, Finish Walls, |
| CAM Operation Identifier | Real | Pointe r to QA Operation |

Fig. 20

Example MDF Structure

METHOD AND SYSTEM FOR CAPTURING, MANAGING AND DISSEMINATING MANUFACTURING KNOWLEDGE

CROSS REFERENCE TO RELATED APPLICATIONS

The present application is a continuation of, and claims priority to, U.S. patent application Ser. No. 10/063,802, filed May 14, 2002, entitled "Method and System for Capturing, Managing and Disseminating Manufacturing Knowledge," which claims priority from U.S. Provisional Application Ser. No. 60/291,298, filed May 15, 2001, entitled "A Method for Capturing, Managing, and Disseminating Manufacturing Knowledge."

Both of the above-referenced applications are herein incorporated by reference in their entirety.

BACKGROUND OF THE INVENTION

1. Field of the Invention

The present invention relates to extracting and managing knowledge regarding a manufacturing process, and more particularly to externalizing manufacturing strategy and know how from engineering design, analysis and manufacturing and planning systems and to integrate knowledge, standards and applications for the manufacturing process.

2. Brief Description of the Related Arts

The design of parts, tools, computer chips etc. have seen incredible advances, especially in the time it takes to go from the design phase to actually manufacturing the part or tool. This renaissance has been brought about mainly by the advent of the computer and specialized software. Conventionally, there are four important types of software programs that are used to facilitate the process from the design phase to the manufacturing phase, as shown in Prior Art FIG. 1.

In a design phase, Computer-Aided Design (CAD) software combines the techniques of drafting and computer graphics to produce models of parts and tools to be manufactured and represents the part or tool geometry in computer language. These models can be manipulated and tested via video display screens until they incorporate the best attainable balance of features, as well as including ease of production and lower cost.

Popular CAD programs include CATIA, Unigraphics, Pro Engineer, AutoCad and Solidworks among others. The CAD program stores the shapes entered as computer files generally in a proprietary format.

A CAD system typically includes the CAD software, a high-end computer workstation, a high-quality graphics monitor, a mouse, light pen, or digitizing tablet for drawing and a printer or plotter for printing design specifications and is often coupled with Computer-Aided Manufacturing (CAM) software through shared databases. CAM systems provide the ability to convert the geometry generated by the CAD program into machining or tool path instructions to make the part on a router, milling machine, lathe or any Computer Numerically Controlled (CNC or NC) machine.

The primary function of CAM programs is the generation of machining instructions to produce parts, tools, etc., taking into account tool or part features such as shape, diameter, thickness, etc. CAM systems are offered by leading CAD vendors such as CATIA, Unigraphics, Pro-Engineer and various independent system vendors such as MasterCam, SurfCam and Gibbs among others.

CAM programs store tool path information, in a file, as a set of executable motion instructions. The format for these commands can be unique to a particular program or a universally accepted standard. The most common standard format is the APT machine tool command language. APT is a common format that can be converted into a set of unique commands used by each CNC machine. The tool path created in the CAM software package is translated into a machine specific G-Code format with the application of a post-processor. Post-processing software accepts the tool path information and allows the user to customize the tool path commands for a particular CNC controller or machine. This post-processing allows for machine specific instructions such as startup and shut down, tool changers, canned cycles or special format requirements.

Process planning systems capture high level steps necessary to create the part. This includes material information, general manufacturing processes, company standards to apply, general instructions, and quality assurance steps.

Process planning systems generally capture "what" each step is as opposed to the details of how each step is performed. For example, a typical system will call out "Set up 1: Rough Part features on Datum A side". The exact instructions, such as what cutters to use, what machining strategies to implement, and the cutting computation, are not captured.

Process planning is usually performed on many different software applications of varying capability. This can be as simple as a standard word processor, an internally developed software tool, or a commercial tool such as HMS-CAPP from HMS Software Inc.

Despite the advances in CAD, CAM, NC machines and process planning systems, as described above, the traditional process still imbeds detailed manufacturing strategies within the NC program, process planning system and is also scattered among other documents, such as engineering drawings, local best practices, mental impressions, trade secrets, etc. Since this valuable knowledge on how the part or object should be optimally manufactured can only be defined within a multitude of proprietary systems, the prior art has several deficiencies in this regard, such as: a) NC programming cannot begin until CAD geometry is released; b) moving parts between suppliers requires significant rework to "reinvent" the manufacturing strategies because there is currently no way to communicate the proven method; c) manufacturing strategy is "buried" in software system settings and data files which are not easily transferable between users; d) the best practices are extremely difficult to capture, share, and implement; e) ensuring standards are being adhered to is difficult; and f) controlling the quality across the NC programmer staff which is dependent solely on programming experience.

The prior art is deficient in providing a manufacturing strategy that is externalized from the multitude of manufacturing software systems and expertise that is capable of providing system manufacturing optimization, cost estimates, and tool path instruction, from among a host of functions, and is available for review, optimization, and communication concurrently with the design phase, thus allowing for more accurate cost estimates, identification of producibility issues and the quantification of each issue, the selection of manufacturing centers with capabilities necessary to optimize part manufacturing, and the implementation of automated machining instructions, that all can be generated and/or accessed from a library of proven manufacturing strategies. The prior art is also deficient in not providing a method for outsourcing that can be controlled by providing suppliers a proven manufacturing strategy to follow.

The prior art also does not address issues regarding quality of NC programmers and other post operations and does not ensure quality control providing for "best-in-class" templates to support the manufacturing process.

SUMMARY OF INVENTION

The present invention has been made in view of the above circumstances wherein manufacturing strategy is externalized and is capable of being shared anywhere in the world independent of manufacturing systems and tools (e.g. CAM, CAPP . . . ). In the present invention, standards are automatically implemented and Numerical Control (NC) programming can begin concurrently with design before final geometry is released. The present invention also brings together and integrates "best practices" into day-to-day actions in the production of a part or object. Manufacturing knowledge in the present invention is also integrated from early on in the design and can be utilized in reoccurring manufacturing procedures in the future.

By creating a meta-data file, manufacturing strategy is externalized from manufacturing systems design files and Is available for review, optimization, and communication. The present invention facilitates accurate cost estimates that can be generated using proven manufacturing strategies. The present invention further supports outsourcing, which can be controlled by providing suppliers a proven manufacturing strategy to follow. The present invention further provides quality control of NC programmers and other post operations by introducing and providing "best-in-class" meta-data file templates into the manufacturing processes. By virtue of decoupling the critical data from the CAD or manufacturing systems, the externalized manufacturing strategy can be shared anywhere in the world independent of CAD or manufacturing systems or planning systems utilized in creating the initial design data files.

To achieve these and other advantages and in accordance with the purpose of the present invention, as embodied and broadly described, the present invention can be characterized according to one aspect of the present invention as including a method for configuring detailed manufacturing knowledge for fabricating an object, the method including the extraction of design criteria from one or more a design data files. The design criteria is captured in a meta-data file. The design criteria is parsed into elemental manufacturing building modules independent of the data file and stored to a meta-data file and a database, wherein the database includes the extracted design criteria and the elemental manufacturing building modules. Manufacturing knowledge and data not contained in the design data file is incorporated into the meta-data. The database is accessed and manufacturing knowledge is extracted, if any, to optimize the manufacturing process of the object to be fabricated and incorporated (i.e. encapsulated in) to the meta-data file, wherein the meta-data file is independent of the one or more design data files from which the design criteria was extracted and the meta-data file is capable of directing the manufacturing of the object.

The present invention can be characterized according to another aspect of the present invention as including a software product for configuring detailed manufacturing knowledge for fabricating an object, the software product residing on a computer readable medium is capable of instructing a general purpose computer to perform and instruction set. The instruction set includes an instruction to extract a design criteria from a one or more design data files and an instruction to parse the design files into elemental manufacturing building modules independent of the one or more design data files and an instruction to store to a database a meta-data file of the extracted design criteria and the elemental manufacturing building modules. The instruction set further includes an instruction for incorporating into the meta-data file manufacturing criteria not contained in the one or more design data files, and an instruction for accessing the database and extracting manufacturing knowledge, if any, and incorporate into the MDF for optimizing the manufacturing process of the object to be fabricated and storing the manufacturing knowledge to the meta-data file, wherein the meta-data file is independent of the one or more design data-files from which the design criteria was extracted and wherein the meta-data file is capable of directing the manufacturing of the part, tool or object.

The present invention can be characterized according to another aspect of the present invention as including a data structure for configuring manufacturing knowledge and expertise in designing and fabricating an object for manufacture, the data structure including a part level strategy section that defines general part level attributes and requirements for manufacturing an object and a numerical control setup section defining object fabrication activities for the object set up on a numerical control machine. The data structure further includes a quality assurance section for defining numerical control machine setup, a post operation section for defining non-machine tooling functions for manufacturing the object and a manual operation section that defines attributes of non-Numerical Control machine driven operations.

The present invention can be characterized according to a further aspect of the present invention as including a software product for configuring detailed manufacturing knowledge for fabricating an object, the software product residing on a computer readable medium capable of instructing a general purpose computer to perform instructions for extracting a design criteria from one or more design data files, instructions for parsing design criteria into elemental manufacturing building modules independent of the one or more design data files and storing to a database a meta-data file comprising the extracted design criteria and the elemental manufacturing building modules and instructions for incorporating into the meta-data file manufacturing criteria not contained in the one or more design data files. The software product further includes includes instructions for accessing the database and extracting manufacturing knowledge, if any, for optimizing the manufacturing process of the object to be fabricated and incorporating the manufacturing knowledge into the meta-data file, wherein the meta-data file is independent of the one or more design data files from which the design criteria was extracted and wherein the meta-data file is capable directing the manufacturing of the object to be fabricated.

The present invention can be characterized according to an additional aspect of the present invention as including a system for configuring detailed manufacturing knowledge for fabricating an object, the system including a data processor having memory capable of inputting and outputting data and instructions to peripheral devices. The system additionally includes a database in communication with the data processor for storing, accessing and retrieving data and a graphical user interface capable of interfacing with and navigating a software product for configuring detailed manufacturing knowledge. The software product is capable of directing the data processor and includes instructions: for extracting a design criteria from one or more design data files; for parsing design criteria into elemental manufacturing building modules independent of the one or more design data files and storing to a database a meta-data file comprising the extracted design criteria and the elemental manufacturing building modules; for incorporating into the meta-data file manufacturing criteria not contained in the one or more design data files; and for accessing the database and extracting manufacturing knowledge, if any, for optimizing the manufacturing process of the object to be fabricated and incorporating the manufacturing knowledge into the meta-data file, wherein the meta-data file is independent of the one or more design data files from which the design criteria was extracted and wherein the meta-data file is capable directing the manufacturing of the object to be fabricated.

The present invention can be characterized according another aspect of the present invention as including a system for configuring detailed manufacturing knowledge for fabricating an object, the system including a data processor and memory capable of inputting and outputting data and instructions to peripheral devices and a database in communication with the data processor for storing, accessing and retrieving data. A graphical user is employed for interfacing with and navigating a software product for configuring detailed manufacturing knowledge. The software product is capable of instructing the data processor to perform instructions pursuant to the software product, the software product includes instructions to: extract a design criteria from design data files; parse design criteria into manufacturing building blocks independent of the design data files and storing to a database the manufacturing building blocks; incorporate into the design criteria manufacturing criteria not contained in the design data files; and accesses the database and extract manufacturing knowledge, if any, for optimizing the manufacturing process of the object to be fabricated and incorporating the manufacturing knowledge into the manufacturing process; and manufacturing the object to be fabricated.

Additional aspects and advantages of the invention will be set forth in part in the description which follows, and in part will be obvious from the description, or may be learned by practice of the invention. The aspects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate several embodiments of the invention and together with the description, serve to explain the principles of the invention.

FIG. 14 depicts a NC setup section of the meta-data file format of the present invention;

FIG. 15 depicts a manual operation section of the meta-data file format of the present invention;

FIG. 16 depicts a quality assurance section of the meta-data file format of the present invention;

FIG. 17 depicts a post operation section of the meta-data file format of the present invention;

FIG. 18 depicts a cutting assembly definition section of the meta-data file format of the present invention;

FIG. 19 depicts a NC action section of the meta-data file format of the present invention;

FIG. 20 depicts a quality assurance action section of the present invention;

DETAILED DESCRIPTION

Figure 1:
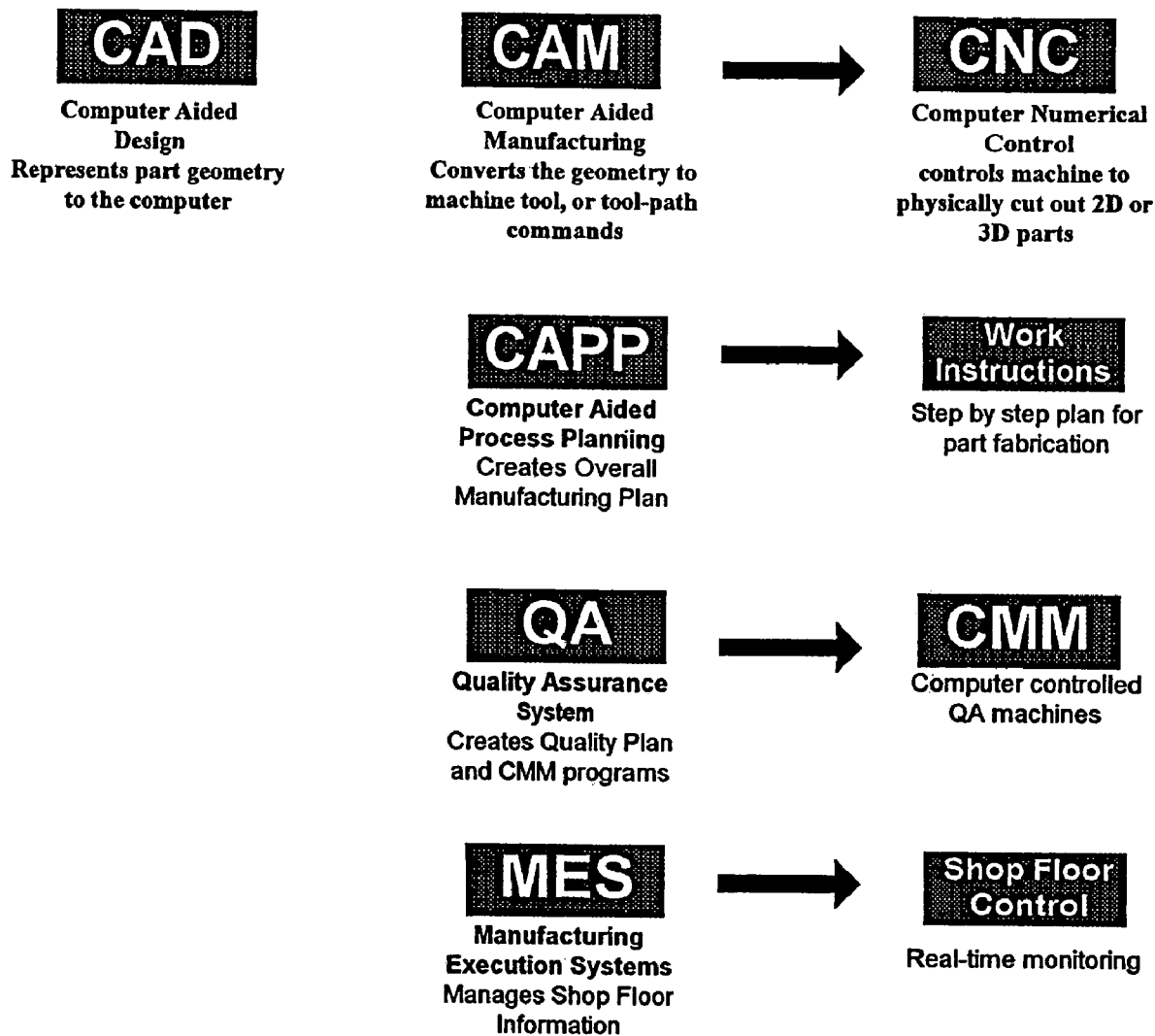
FIG. 1 depicts a Prior Art view of a conventional CAD, CAE, CAM and NC machine function and operation.

Reference will now be made in detail to the present embodiments of the invention, examples of which are illustrated in the accompanying drawings. Wherever possible, the same reference numbers will be used throughout the drawings to refer to the same or like parts (elements).

In accordance with the present invention, the present invention includes a method for configuring detailed manufacturing knowledge for fabricating an object, the method including the extraction of design criteria from one or more design data files. The design criteria is captured in a meta-data file. The design criteria is parsed into elemental manufacturing building modules independent of the data file and stored to a database and a meta-data file including the extracted design criteria and the elemental manufacturing building modules. Manufacturing knowledge and data not contained in the design data file is incorporated into the meta-data file. The database is accessed and manufacturing knowledge is extracted, if any, to optimize the manufacturing process of the object to be fabricated and storing the manufacturing knowledge to the meta-data file, wherein the meta-data file is independent of the one or more design data files from which the design criteria was extracted and wherein the meta-data file is capable of directing the manufacturing of the object.

The present invention further includes a data structure for configuring manufacturing knowledge and expertise in designing and fabricating an object for manufacture, the data structure including a part level strategy section that defines general part level attributes and requirements for manufacturing an object and a numerical control setup section defining object fabrication activities for the object set up on a numerical control machine. The data structure further includes a quality assurance section for defining numerical control machine setup, a post operation section for defining non-machine tooling functions for manufacturing the object and a manual operation section that defines attributes of non-Numerical Control machine driven operations.

The present invention additionally includes a software product for configuring detailed manufacturing knowledge for fabricating an object, the software product residing on a computer readable medium capable of instructing a general purpose computer to perform instructions for extracting a design criteria from one or more design data files, instructions for parsing design criteria into elemental manufacturing building modules independent of the one or more design data files and storing to a database a meta-data file comprising the extracted design criteria and the elemental manufacturing building modules and instructions for incorporating into the meta-data file manufacturing criteria not contained in the one or more design data files. The software product further includes instructions for accessing the database and extracting manufacturing knowledge, if any, for optimizing the manufacturing process of the object to be fabricated and incorporating the manufacturing knowledge into the meta-data file, wherein the meta-data file is independent of the one or more design data files from which the design criteria was extracted and wherein the meta-data file is capable directing the manufacturing of the object to be fabricated.

The present invention still further includes a system for configuring detailed manufacturing knowledge for fabricating an object, the system including a data processor having memory capable of inputting and outputting data and instructions to peripheral devices. The system additionally includes a database in communication with the data processor for storing, accessing and retrieving data and a graphical user interface capable of interfacing with and navigating a software product for configuring detailed manufacturing knowledge. The software product is capable of directing the data processor and includes instructions: for extracting a design criteria from one or more design data files; for parsing design criteria into elemental manufacturing building modules independent of the one or more design data files and storing to a database a meta-data file comprising the extracted design criteria and the elemental manufacturing building modules; for incorporating into the meta-data file manufacturing criteria not contained in the one or more design data files; and for accessing the database and extracting manufacturing knowledge, if any, for optimizing the manufacturing process of the object to be fabricated and incorporating the manufacturing knowledge into the meta-data file, wherein the meta-data file is independent of the one or more design data files from which the design criteria was extracted and wherein the meta-data file is capable directing the manufacturing of the object to be fabricated.

The present invention also includes a system for configuring detailed manufacturing knowledge for fabricating an object, the system including a data processor and memory capable of inputting and outputting data and instructions to peripheral devices and a database in communication with the data processor for storing, accessing and retrieving data. A graphical user interface is employed for interfacing with and navigating a software product for configuring detailed manufacturing knowledge. The software product is capable of instructing the data processor to perform instructions pursuant to the software product, the software product includes instructions to: extract a design criteria from design data files; parse design criteria into manufacturing building blocks independent of the design data files and storing to a database the manufacturing building blocks; incorporate into the design criteria manufacturing criteria not contained in the design data files; and access the database and extract manufacturing knowledge, if any, for optimizing the manufacturing process of the object to be fabricated and incorporating the manufacturing knowledge into the manufacturing process; and the manufacture the object to be fabricated.

The design data file can be generated by many different program sources such as CAE, CAD, CAM, CAPP, Planning Systems, and tool path programs, among others, as shown in prior art FIG. 1. Also any drawings, plans and databases containing standards, best practices etc. can also be accessed and utilized to provide the meta-data file with additional manufacturing information. Basically, the detail knowledge can come from any extractable source.

The present invention further includes a software product for configuring detailed manufacturing knowledge for fabricating an object, the software product residing on a computer readable medium is capable of instructing a general purpose computer to perform and instruction set. The instruction set includes an instruction to extract a design criteria from a one or more design data files and an instruction to parse the design criteria into elemental manufacturing building modules independent of the one or or more design data files and storing to a database a meta-data file of the extracted design criteria and the elemental manufacturing building modules. The instruction set further includes an instruction for incorporating into the meta-data file manufacturing criteria not contained in the one or more design data files, and an instruction for accessing the database and extracting manufacturing knowledge, if any, for optimizing the manufacturing process of the object to be fabricated and storing the manufacturing knowledge to the meta-data file, wherein the meta-data file is independent of the one or more design data-files from which the design criteria was extracted and the meta-data file is directing the manufacturing of the object.

The reader should note that throughout the specification any references to CAM, CAD, CAE, CAPP, Planning Systems or similar and complimentary software programs are used to refer to the general nature and concepts underpinning these software systems/programs as a class. The overall package and concepts may have been modified by numerous vendors, incorporated in to suites and customized for third parties, yet they retain their core attributes and function substantially the same in that they assist the user in the design, analysis and manufacture of an object, part or tool.

Finite-element Analysis (FEA) is one example of a commonly used software analysis tool. It generally provides for mechanical simulation of a part or object in which the structure or part is divided into small elements with easily defined stress and deflection characteristics. It can be utilized to provide dynamic, thermal and fluid analysis.

Product data management (PDM) software and systems organize, manage and track products, drawings and design or model data via a database management system and is utilized to control information, files, documents and work processes necessary to design, manufacture, support, distribute and maintenance of a product. The information typically managed by the PDM includes, but is not limited to, design geometry, engineering drawings, project plans, part files, assembly diagrams, product specifications, NC machine-tool programs, analysis results, correspondence, bills of material (BOMs) and engineering change orders (ECOs). Essential PDM software provides the conduit for ideas, information and changes throughout supply and manufacturing chains.

Enterprise Resource Planning (ERP) systems are primarily utilized to plan and manage manufacturing operations and Supply Chain Management (SCM) systems let suppliers play a role in the manufacturing process.

One aspect of the present invention is the ability to manage the manufacturing knowledge external from typical software programs and data files and planning systems, which allows dissemination of the knowledge without requiring users to have the same underlying proprietary software system.

The MDF file can be created, matured, and released concurrent with engineering design activities to capture manufacturing requirements, material preparation activities, support producibility and costing applications. After design release, the MDF is populated with actual manufacturing elements to drive automated manufacturing and status tracking applications. The present invention is also capable of providing a vehicle for reuse of standards and distribution of proven manufacturing methods.

By capturing the manufacturing methods for a part in an independent way, new processes can be implemented to optimize internal manufacturing centers as well as in the exchange of work between suppliers, in the multi-sourcing of parts and in the integration of the supply chain.

MDF files can be populated through user interactions via a MDF Editor, which provides users with the ability to create, modify, manage, and release the MDF file by extracting data from a completed CAM NC or similar type program through a system interface. A host of system interfaces are provided by the present invention initially to meet third party needs. The present invention contemplates the addition of and the incorporation of additional system interfaces to accommodate various manufacturing systems, CAM programs and NC machines of the end user. A person of ordinary skill in the art will appreciate that the system interfaces can be readily modified to keep pace with evolving technology and equipment updates by the vendor/supplier.

The MDF further includes Internet viewing functionality that allows even the smallest vendor or manufacturer, anywhere in the world, to evaluate and implement proven manufacturing methods, standards, best practices etc.

The information managed in the MDF matures from early part design, when the information is basic manufacturing requirements and recommendations (e.g. machine envelope requirements, cutting tools recommendations, etc.) to the actual management of manufacturing center specific data (e.g. the actual machine envelope of the machine where the part is to be manufactured and the cutting tool for a specific shop by tracking number) later in the process.

The MDF file can be formatted in an XML format or HTML format or similar data structure or file that captures information and relationships between information as necessary.

A library of MDF files, in multiple file formats, can be managed to provide proven methods for manufacturing parts within a part family, category, sub-category or grouping. These proven methods can then be transferred to suppliers, anywhere in the world, and implemented in the manufacturing methods applied to build the part.

The MDF provides the basis for a series of enhanced manufacturing processes and applications. The process and applications include, among others, detailed part cost estimation (Cost Advisor), producibility feedback (Producibility Advisor), searching for the most capable suppliers (Supplier Search Advisor), concurrent and enhanced NC programming (Tool Path Advisor), and integrating manufacturing experts into an Internet community (Knowledge Associates Network).

The MDF can be integrated with CAM systems (e.g. CATIA MFGPROG, UG Manufacturing Module, etc.) and process planning systems through Application Programming Interfaces (API) to provide a complete end-to-end integrated solution.

Figure 2:
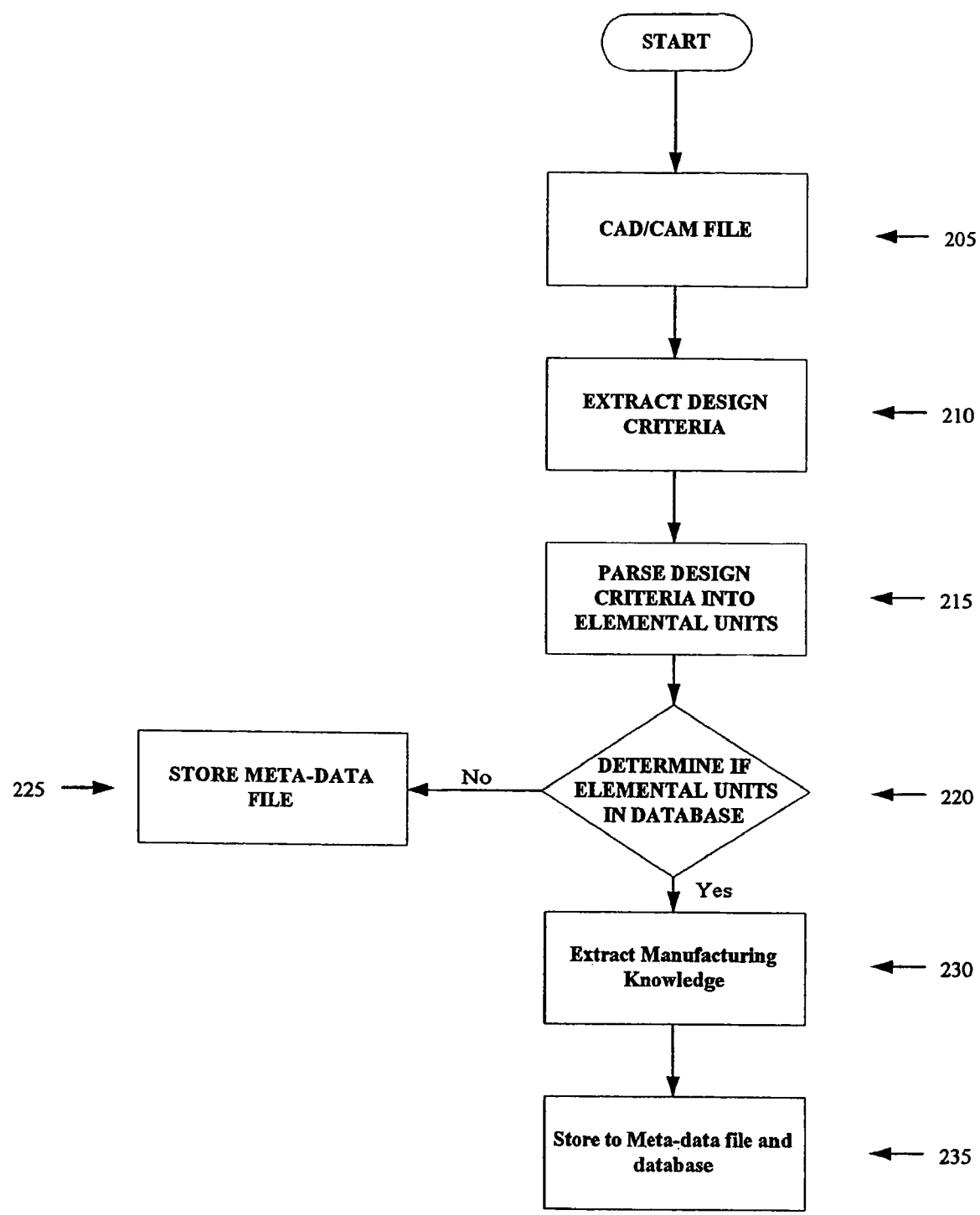
FIG. 2 illustrates a schematic diagram of one embodiment of the present invention.

FIG. 2 illustrates the basic process in the creation of the meta-data file or data structure. At step 205 the file has been created by the designer and saved to one of the multitude of file formats. At step 210 the present invention extracts the design criteria from the design data file. For instance, if the design calls for cutting three 1"H×1"W×1"D cut-outs in a titanium or other type of material the present invention extracts this information and the design criteria. The typical program represents this procedure as one transaction or event and not three separate transactions or events. In this example the present invention extracts the numbers of cutouts, their dimensions the preferred material to utilize and so on until it has the required information to execute the design.

At step 215 the design criteria extracted in step 210 is further parsed to determine if the design criteria can be further reduced into simpler units such as manufacturing building modules, basic building blocks, etc. By way of analogy, this would be like taking a molecule and breaking into its constituent atoms. Therefore, in the above example the three 1"H×1"W×1"D cut-outs would not be integrated together as in the conventional data file but be parsed into a single 1"H×1"W×1"D cut-out being performed three times. This allows for ease of design manipulation. In the present invention if one of the cut-outs is altered only that cut-out need be modified. In the engineering designing system of the prior art the single entry for the three 1"H×1"W×1"D cut-outs must be modified.

At step 220 it is determined if the elemental module, unit or building block is already within the database. Typically, after a period of use, the user will have built-up a library of elements, parts, tools, etc. with attendant manufacturing know how, mental impressions, and expertise in the fabrication of that part. If it is determined that the elemental module or building block is in the database then the elemental manufacturing building block is selected along with its attendant manufacturing information, step 230. If the elemental manufacturing building block is not found in the database, it is stored in the database and is incorporated as shown at step 225.

At step 230, depending on the outcome of the search performed at step 220, manufacturing knowledge, if any, is extracted from the database and at step 235 the design criteria, incorporating any elemental modules and manufacturing knowledge, is incorporated into the meta-data file.

The MDF is an organized and quantified collection of manufacturing "elements". These elements are assembled and managed in the MDF file to define the detailed manufacturing approach for metallic, plastic, ceramic or composite parts and tools. The elements are managed in such a way as to allow population of manufacturing requirements early in the designing process and then the instantiation of specific information to support the down stream manufacturing processes.

Figure 21:
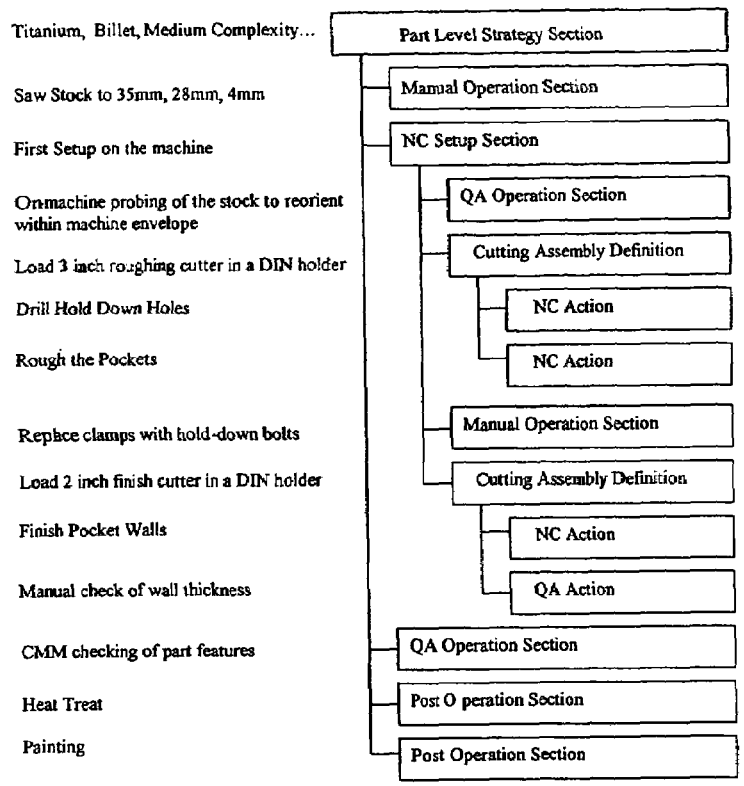
FIG. 21 depicts an example of a meta-data data structure/file of the present invention.
Figure 22:
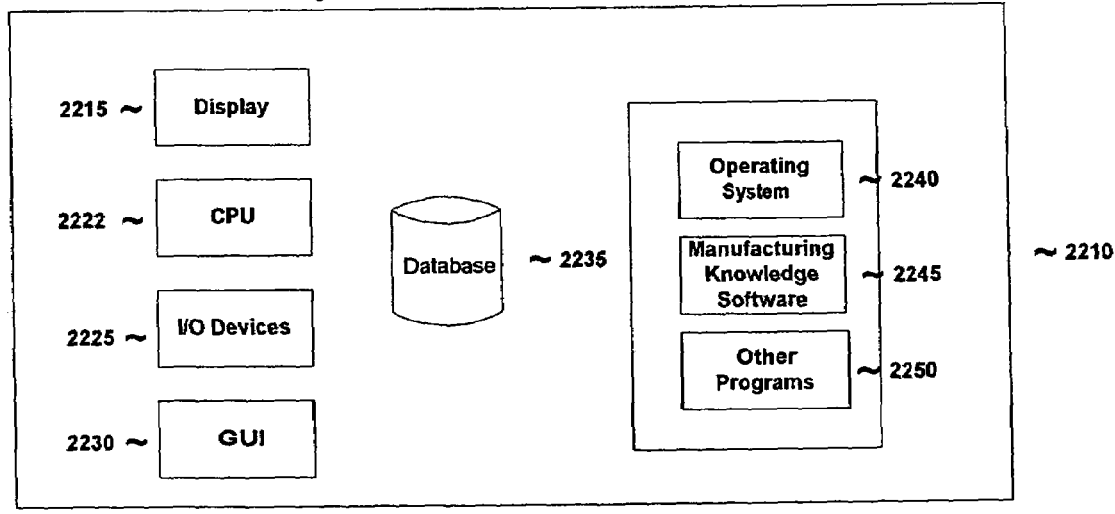
FIG. 22 depicts a system diagram of the present invention.

The MDF includes at least one Part Level Strategy, as shown in FIG. 21, or Header Section contains the general part level attributes and requirements. The Header section, not shown, contains attributes that apply to the entire MDF and manages the order and organization. The Part Level Strategy section includes, but is not limited to, attributes such as material, part type, stock type, etc.

FIG. 14 depicts a Manual Operation Section table or file. The Manual Operation Section defines attributes of "non-NC driven" operations such as manual sawing, moving clamps, manual hole drilling. These operations provide context for important transition activities, help drive accurate overall cost estimates, and in developing optimized manufacturing plans.

FIG. 15 depicts a QA (quality assurance) Operation Section table or file. The QA Operation Section defines QA activities that do not occur on a machine tool. Activities occurring during a machine tool setup typically are managed within a NC Operation Section as a QA Action. Typical activities include Coordinate Measuring Machine (CMM) checks, manual QA checks, layout checks, etc.

FIG. 16 depicts a NC Setup Section table or file. The NC Setup Section manages the part fabrication activities for a single part "set up" on the machine. Typically, this manages all activities between operator interactions to physically move the part. The Section manages a series of operations such as cutting assembly definition, NC actions, QA Actions, and Manual Operations (operations that require operator action like moving clamps or adding hold-down bolts). The NC Setup Section further includes information regarding NC Programmer User, versioning and machine specification. As new models or versions of the NC machine become available the NC program may have to be modified to fully utilize the capabilities of the new NC machine or may have to be modified for the new NC machine to work at all. The present invention via an MDF editor can produce or modify interfaces to support the continuous full functionality and operation of the MDF and the manufacturing process.

FIG. 17 depicts a Post Operation Section table or file. The Post Operation Section manages operations such as heat treating, chemical processing, etc. This section provides context to support costing, managing proven manufacturing methods, and captures necessary steps in the manufacturing process. The Post Operation Section includes post processing type, post processing requirements, and status tracking dates among others.

FIG. 18 depicts a Cutting Assembly Definition section table or file. It defines the cutting tool assembly to be used in a section of the MDF. If the same cutting tool assembly is used later in the MDF, it is listed again in the appropriate location relating to the order of the operations. The Cutting Assembly Definition starts with basic requirements early in the process and will later mature into shop specific definitions. The Cutting Assembly Definition includes cutting tool descriptions, holder descriptions, cutting tool assembly identifiers, base speeds and feeds.

FIG. 19 depicts a NC Action element table or file. The NC Action defines a single NC component (e.g. finish floor of the pockets). A Cutting Assembly definition typically will have one or more NC actions assigned to it, as each defines a particular machining task. The NC Action element includes NC operation type, feature group, feature type, and cutting parameters among others.

FIG. 20 depicts a QA Actions table or file. The QA Actions are manual checking activities that occur during a setup on the machine that do not require automated methods like machine probing. These operations include, but are not limited to, QA operation types, feature group types and feature types.

As previously stated, with the MDF of the present invention, the manufacturing strategy is externalized from the designing system and is available for review, optimization, and communication. The MDF supports accurate cost estimates that can be generated using proven manufacturing strategies. Outsourcing can be controlled by providing suppliers a proven manufacturing strategy to follow. Quality control of NC programs and other post operations can be managed by providing "best-in-class" MDF templates to the manufacture of the particular object or parts.

The manufacturing strategy is externalized and can be shared anywhere in the world independent of the original authoring tools or the software packages and programs utilized by the manufacturer or supplier. In the present invention, standards are automatically implemented, thus detailed manufacturing activities such as NC programming can begin concurrently with the engineering design and before final geometry is released. By virtue of this functionality, best practices are capable of being integrated into the day-to-day operations of the manufacture. With the advent of manufacturing knowledge being integrated from early in the design phase, the best configuration of equipment, supplier and practices can be incorporated initially in to the overall design.

FIG. 21 depicts an example of a meta-data file or data structure of the present invention.

Figure 3:
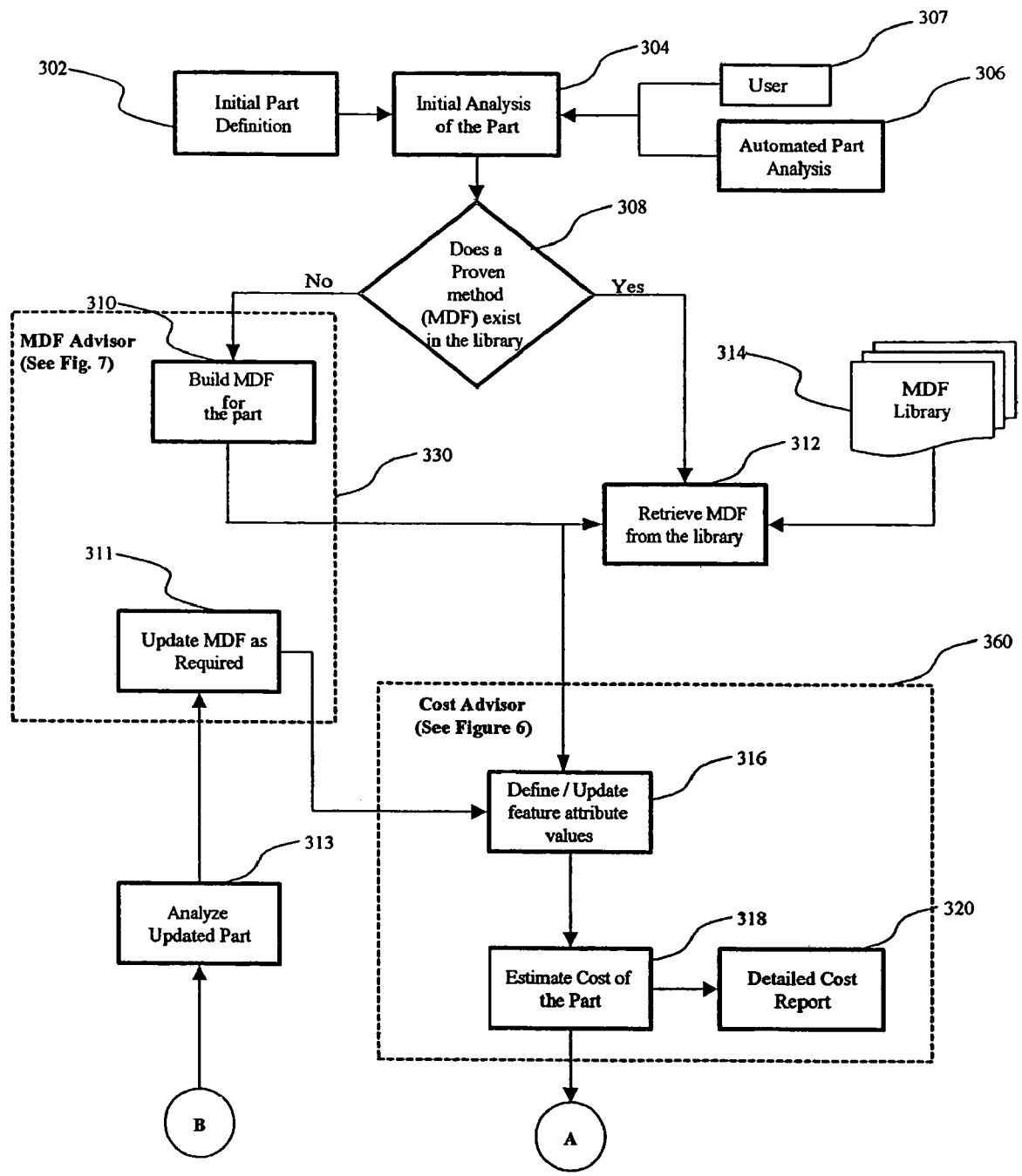
FIG. 3 depicts a portion of a schematic diagram of the operation of the present invention.

A detailed description of another aspect of the present invention will be undertaken regarding the path flow and logic of the invention. The designer via part definition module 302 defines the preliminary definition of the part, as shown in FIG. 3. Depending on the design phase, this may be a simple sketch or a preliminary solid model definition. The design makes the part definition available to a manufacturing focal. In the initial analysis module 304 retrieves the part design. The part is either analyzed via automated part analysis module 306, or is completed manually by the user. A basic manufacturing approach is determined at this point, if multiple approaches are available they can be generated and explored at a later time or the user can be provided with multiple scenarios if the differences in cost and production time fall within a predetermined range range of each other.

The manufacturing focal determines whether an existing meta-data file (MDF) input exists for the manufacturing approach via module 308. If a MDF does exist, the MDF is retrieved by retrieval module 312 from a MDF library as defined by MDF library module 314. For instance, if the CAD design calls for the fabrication of a titanium spar with pockets on both sides, the present invention determines if it has within its database an exact match for the desired manufacturing approach or a manufacturing approach or template in close proximity to the desired manufacturing approach. In this example the database will most likely find a design for a titanium plate part with a best in class manufacturing approach for cutting titanium. The approach defines the best manufacturing practice for cutting the pockets, but does not specify the number of pockets. Based on the design, the number of pockets are entered.

In the standard CAM case, the know how associated with the cutting of the pockets has to be determined and relearned for every part. The machining instructions are also determined for each part independently and are dependant on the skills, knowledge and experience of the manufacturing focal. The conventional CAD and CAM designs do not break the design into individual elemental modules or building blocks that can be used independently of the current design. All knowledge is imbedded in the design parameters and is not easily extracted for future use.

If the library does not contain a MDF with an appropriate manufacturing approach, the producibility analyst via module 310, as shown in FIG. 3, creates a new MDF, typically starting with the closest available MDF in the library, and modifying it for the specific design.

Modules 316, 318 and 320 describe the high level processes utilized to support the calculation of a cost estimate utilizing the selected MDF. Module 316 defines feature attributes and describes the user action of entering basic part parameters, such as material and stock type, defining part features, like pockets and holes and describing post processes-like cleaning and shot peening.

Estimating the cost of a part is performed by module 318, which directs the cost engine analyzing part attributes and the MDF file and utilizes a series of cost rules to calculate a cost estimate for recurring and non-recurring manufacturing activities. A detailed cost report is generated via module 320.

Figure 4:
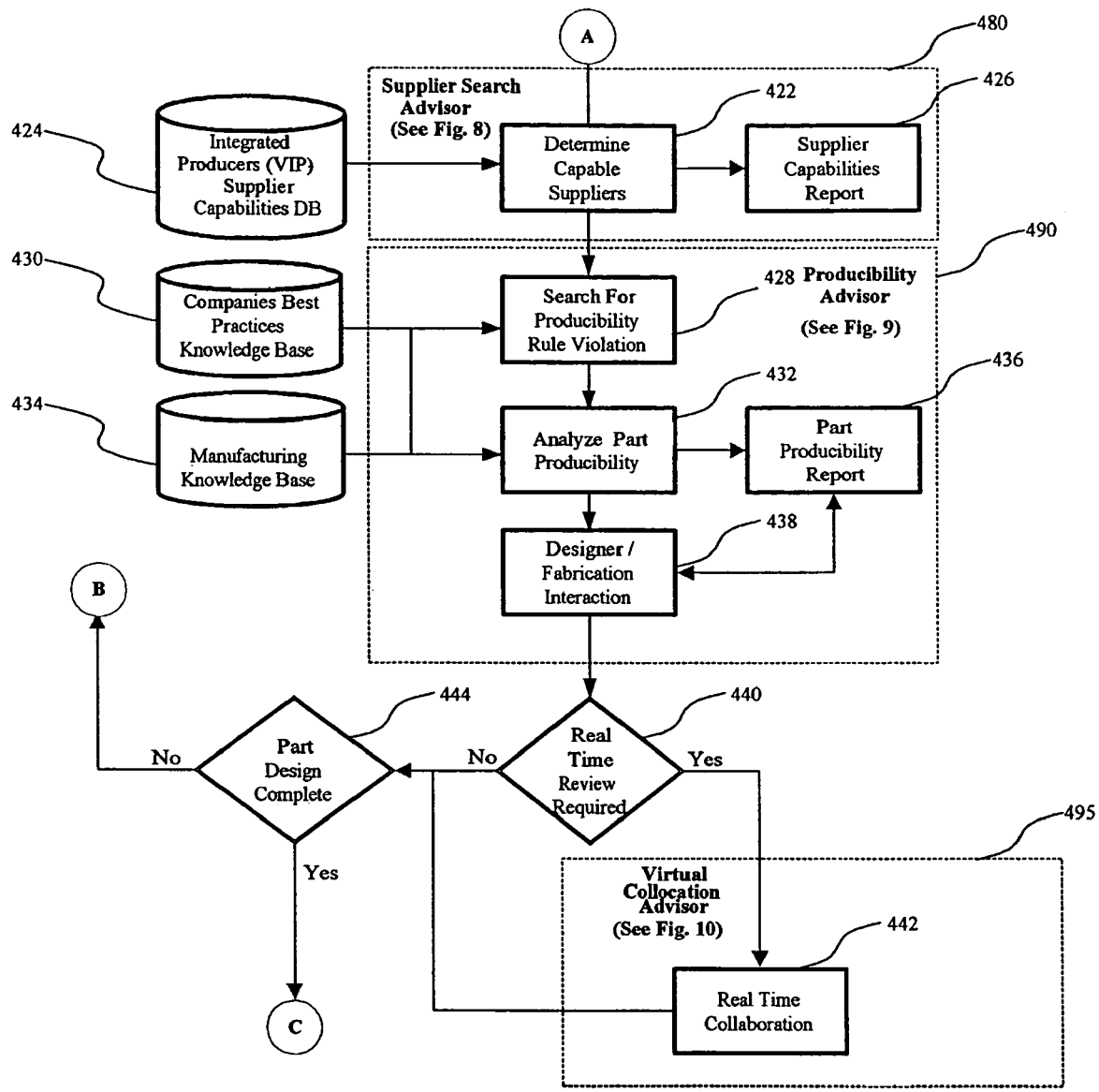
FIG. 4 is a schematic diagram continuation of FIG. 3 of the present invention.

The Supplier Advisor application, as shown in FIG. 4, embodied in module 422 analyzes part manufacturing requirements defined in the MDF definition and the user entered part attribute information to: 1) determine possible suppliers with the manufacturing capabilities necessary to manufacture the part; and 2) analyze particular supplier capabilities to document possible limitations and issues. The Integrated Producer (VIP) Supplier Capability Database, defined in module 424, contains detailed manufacturing capabilities of suppliers, worldwide. This includes number and type of machines, post processing operations available, and machines and engineering capabilities. Module 426 generates a detailed supplier report based on this data.

In the Producibility Advisor application, manufacturing rules from using companies Best Practices Knowledge Base module 430 and from Manufacturing Knowledge Base module 434 along with the MDF and manufacturing attribute data are analyzed and part producibility violations, limitations and constraints are identified via modules 428 and 432. A detailed producibility report is generated and configured by module 436. The producibility analyst (i.e. user or designer or engineer) interacts with the designer, over the Internet or other communication network, using the Producibility Advisor, to track all issues to closure. Designer/fabrication interaction module 438 describes and facilitates the interaction between the designer and producibility analyst.

In module 440 a determination of whether a real time collaborative review is needed. The real time collaboration is accomplished utilizing a Virtual Collocation Advisor application of module 442. This occurs if issues cannot be resolved through the standard producibility process or if issues require multiple parties interacting in real time. The real time collaboration session brings together all needed designers and manufacturing experts into a "virtual" session to review and close producibility issues. This session integrates the cost study 318, producibility report 436, MDF, part attributes, and part geometry into a shared user session on multiple Internet, WAN, LAN, or communications network connected via computers and workstations.

If the part is released by the design group via module 444, the manufacturing processes will begin. If the part is still undergoing iterations by the designers, the part is analyzed by the producibility expert each time a change is identified by module 313, as shown in FIG. 3. The analysis focuses on what changed between design iterations. If a change in the part requires the manufacturing strategy to be modified, the MDF is updated as required via module 311. The process iterates again as required until the part design is completed and released.

Figure 5:
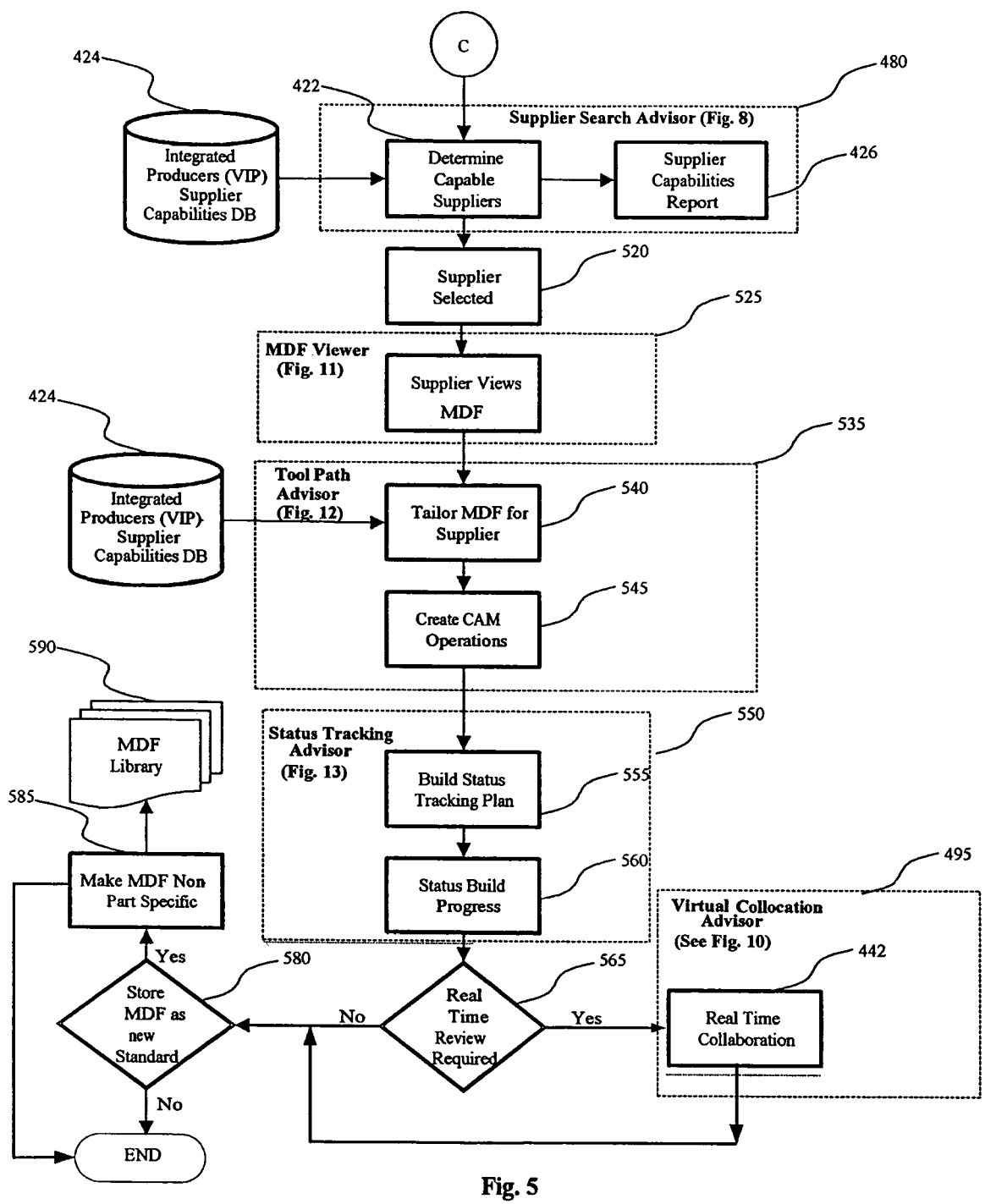
FIG. 5 depicts a schematic diagram continuation of FIG. 3 and FIG. 4 of present invention.

Utilizing the MDF, producibility report, and part attributes, suppliers with the capabilities required to produce the part are identified in the Supplier Search Advisor application of module 480, as shown in FIG. 4 and FIG. 5. The VIP Suppliers Capability Database module 424, is used as a reference on what capabilities each supplier has available. A detailed report is generated for suppliers via module 426, as shown in FIGS. 4 and 5.

Once the design company selects a supplier via module 520, the MDF and supporting knowledge is made available to the supplier, over the web or other global communication network, anywhere in the world.

The supplier can then access the MDF Viewer application module 525, to review the manufacturing strategy developed throughout the process. The MDF is then tailored for the specifics of the selected supplier in module 540. This is accomplished in the Tool Path Advisor application utilizing the Integrated Producers (VIP)—Suppliers Capabilities Database as defined by module 424. Computer Aided Manufacturing (CAM) operations are created, in the suppliers desired CAM system software, by linking the MDF to the CAM system through Application Programming Interfaces (API) links module 545.

An MDF is tailor made via module 540 for supplier. The MDF is then utilized to create a CAD or CAM or software data file via module 545. The MDF is used to define the basic structure of a Build Status framework module 555. Each major element of manufacturing, (i.e. each NC setup, CMM operation, and post processing step) is listed and the supplier defines a planned start and end dates for each. As the manufacturing proceeds, the supplier maintains the report updating status of each of the major tasks via module 568. Modules 555 and 560 comprise part of the Status Tracking advisor 550.

At module 565 a determination is made whether a real-time collaboration session is required. A collaboration session via Virtual Planning module 555 may be set-up to resolve a particular problem, review a part design, or review status. Collaboration Advisor 570 and real time collaboration module 575 are capable of integrating a video image from the suppliers shop with all other configured part knowledge.

Once the part is completed and the manufacturing approach is proven, a determination of whether the MDF should be stored as either a new standard, variant of the standard or alternate standard in the MDF library is performed via module 580. In module 585, the manufacturing expert reviews the MDF and takes out all part specific items and stores the MDF in the MDF library module 590.

Figure 6:
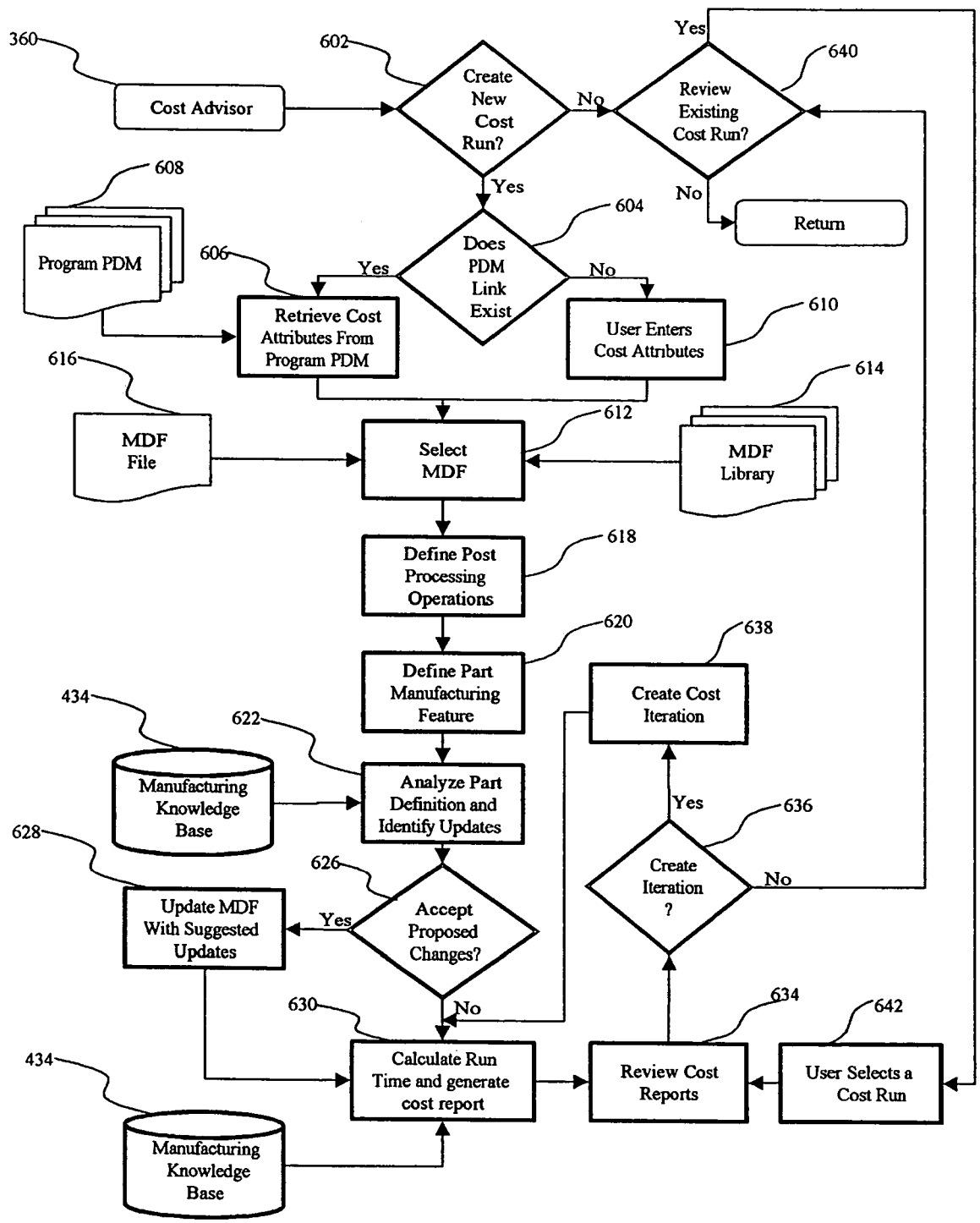
FIG. 6 depicts a schematic diagram of a cost advisor module of the present invention.

In the Cost Advisor application 360, detailed cost reports are generated for the manufacturing processes encapsulated in the MDF. The user can either start a new cost run via module 602, or review an existing cost run, module 640, as shown in FIG. 6. When the cost advisor is executed, the application first determines whether a link to the users Product Data Management (PDM) system module 604 exists. This link is capable of being accomplished by creating an XML, HTML or similar interface to the programs specific data.

If there is a link to the users PDM system, module 606 retrieves the cost attributes from the PDM, described in program PDM module 608, and is loaded into the Cost Advisor application 360. If no link exists, then via module 610, the user is prompted to enter cost attributes. These attributes include material type, stock, type, number of part produced, complexity of the part, etc.

In module 612, the user is then prompted to select a meta-data file (MDF) file from either the MDF library module 614, or from a personal or shared file module 616.

The MDF describes the detailed manufacturing methodology to apply in the cost run. This includes the order of operations, cutting tools, feeds/speeds, among other parameters. In module 618, the user is then presented with a list of post processing operations to consider. These include operations like cleaning, painting, heat treating, shoot peening, etc. The user selects the post operation type that applies and the number of operations required.

The MDF is parsed, and all referenced feature groups along with their related feature types are extracted. Based on the feature types and the corresponding manufacturing operation defined in the MDF, the user is presented a list of feature definitions to define. In module 620, the user enters the associated feature information such as length, width, and depths of pockets, diameter and depths of holes, and lengths, widths, depths of profiles, and etc.

The part definition, including the part features, MDF methodology, and post processing operations are analyzed via module 622. The feature analysis evaluates factors such as appropriate cutter selection given the feature dimensions and whether the offset values, step over, and depths of cut are appropriate. The manufacturing knowledge used in determining the possible overrides is contained in the Manufacturing Knowledge Base module 624.

In module 626, the user is presented with the current values along with the suggested overrides. The user can select none, one, many, or all of the override conditions to apply. If override values are selected, then in module 628, the MDF is updated with these values. The cost engine is then executed via module 630. The cost engine uses the MDF and feature attributes to determine the run times for each operation of the MDF. A Manufacturing Knowledge Base, as defined in module 632, is the repository for the run time calculation rules and methods. The costing engine also creates a detailed cost report with non-recurring and recurring costs segmented into major categories and visual pie charts.

For example, a roughing operation for a group of pockets defined in the MDF has a defined cutting tool, depth of cut, tool motion definition, feed/speed, and entry/exit method. Using this information along with the feature definition defining the size of the pockets, the estimated run time can be calculated by mathematically estimating the tool path motion and speed.

The cost engine also uses information about the overall size of the part, the complexity, number of features, MDF complexity, the number of operations in the MDF, and other part attribute information, to determine all other recurring and non-recurring cost estimates for the part. In module 634, the user can review a detailed cost report and the user has the option to begin the entire cost process again, or via module 636, generate a cost iteration. A cost iteration is the ability to change one or more values from the cost run and generate another report as defined by module 638. For example, the stock type could change from a billet to a forging, and a new cost estimated would need to be generated via Calculate Run Time module 630.

The user can also review an existing cost run that has been previously saved via module 640. The user is presented a list of accessible cost runs managed by the user, and module 642 provides the user with the ability to select from the list. The user is then then able to review reports and run iterations if desired.

Figure 7:
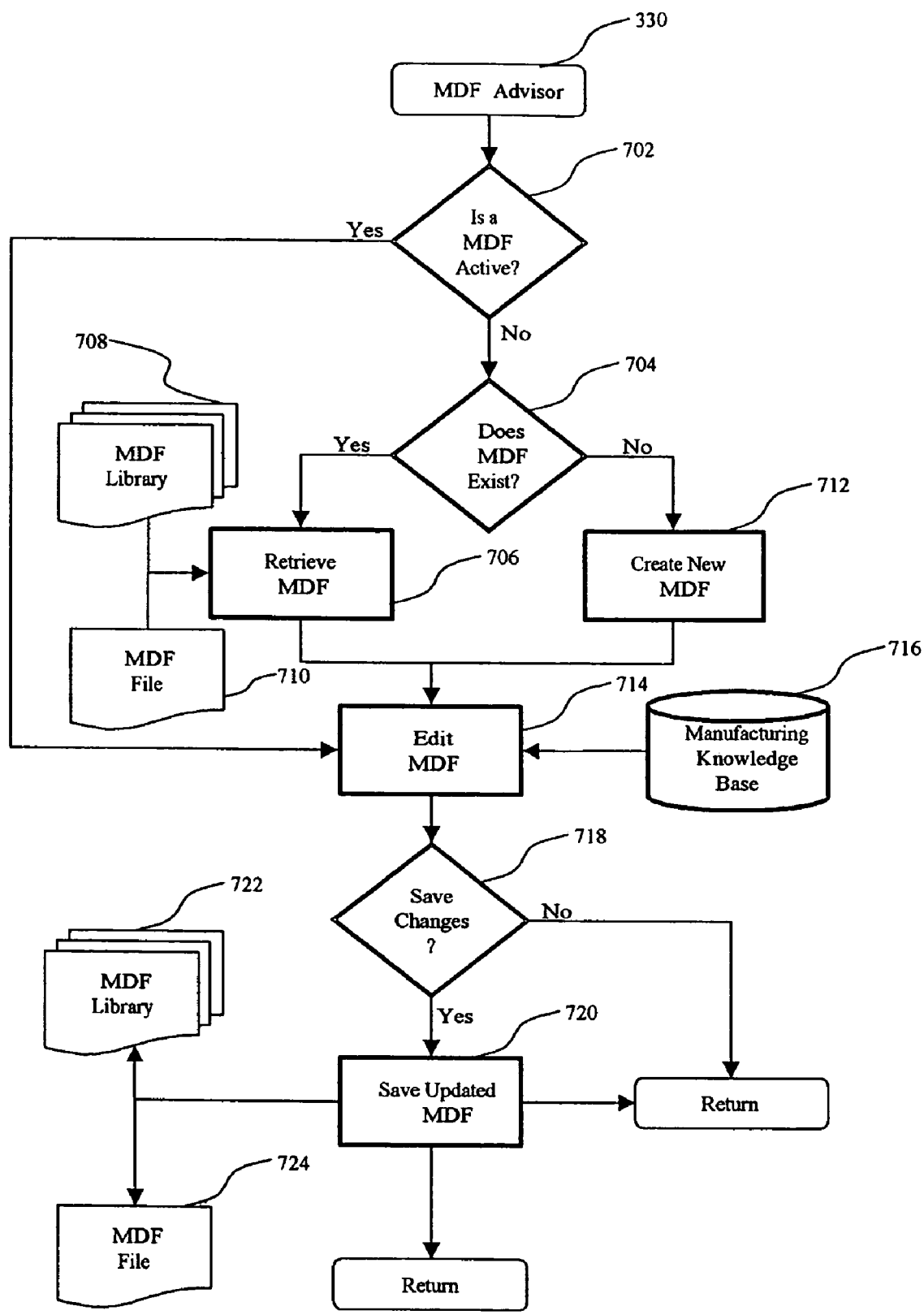
FIG. 7 depicts a schematic diagram of a meta-data file advisor of the operation of the present invention.

The MDF advisor allows the creation and manipulation of a MDF to capture detailed fabrication processes. In module 702, as depicted in FIG. 7, the system determines whether a MDF is currently active, and the user selects to continue with the current active MDF or select another. The MDF Advisor is used to read, review, modify, update, and save MDF files. The user is first queried about opening an existing MDF or creating a new MDF via module 704.

Module 706 describes the retrieving of an existing MDF. The user can select a MDF from the MDF library of standard manufacturing methodologies, as defined in module 708, or from a file or database, as defined in module 710. If no current MDF exists, the user can create a new MDF by adding required MDF attributes like name and user as describe by module 712.

The MDF information can be edited via module 714. The information that can be edited via module 714 includes, but is not limited to, adding a machining set-up, adding a cutting tool operation, defining a NC action, defining a CMM action, defining a post process activity, and defining planning dates for major activity.

Throughout the editing process, the user interacts with the Manufacturing Knowledge Base module 716. Module 716 contains company and proprietary standards for pocketing routines, cutting tool suggestions, suggestions to reduce cost and complexity, among other manufacturing suggestions. A user can decide whether or not to save updates in module 718. In module 720, the updated MDF can be saved either to the MDF library, module 722, or to system file module 724.

Figure 8:
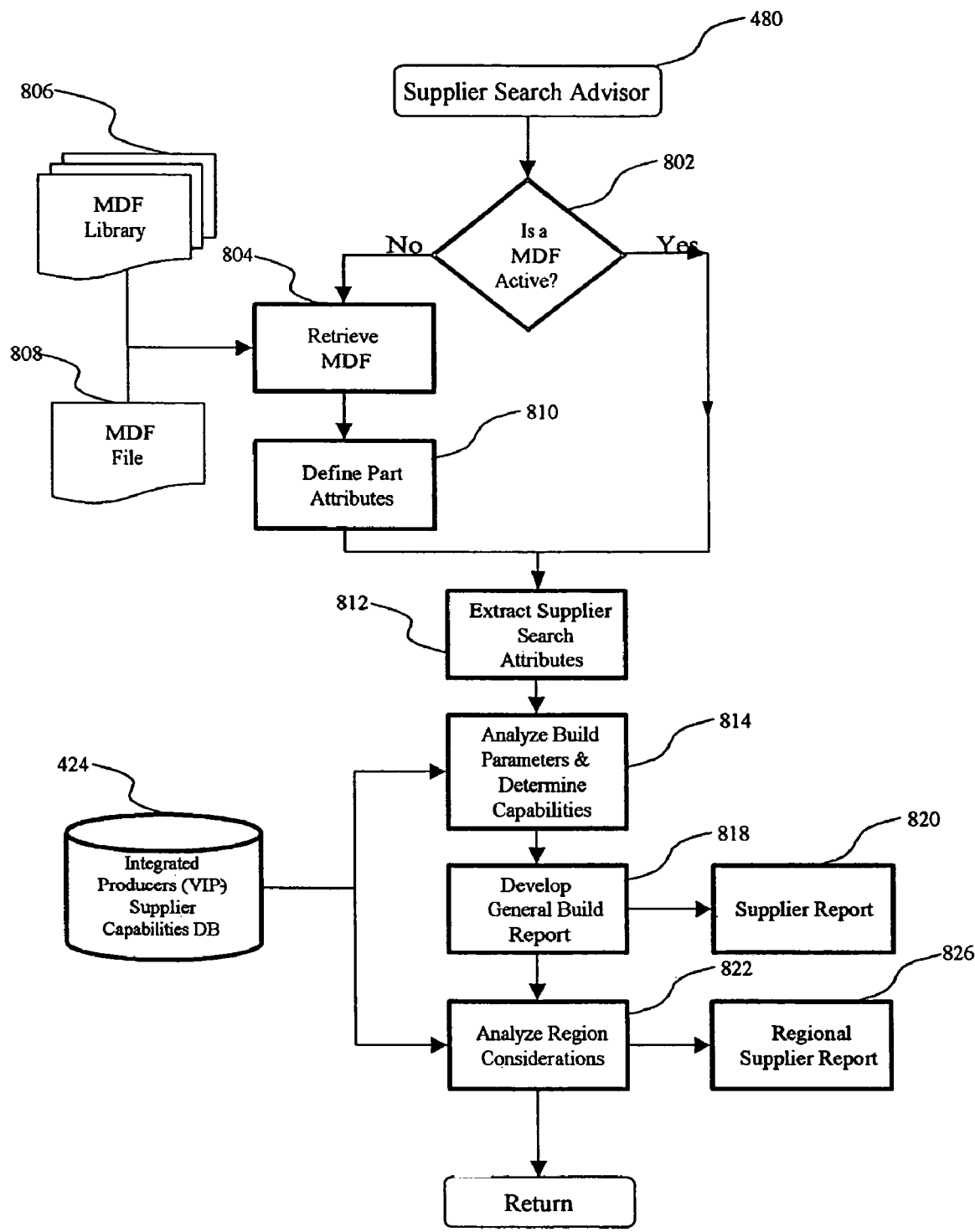
FIG. 8 depicts a schematic diagram of a supplier search advisor module of the present invention.

In the Supplier Search Advisor application 480, capable suppliers are identified and their possible capability deficiencies are documented. The application checks via module 802, as shown in FIG. 8, as to whether or not a MDF file and all associated part attributes have been defined and are active and available. If there is no current MDF, the user is prompted via module 804 to select a MDF. The user can select from a MDF library, defined in module 806, or from a local file or database module 808.

Once the MDF is selected, additional attributes are defined for the part in module 810. This includes all major manufacturing activities, part material, part size and complexity, among others. In module 812, the part attributes necessary to search for suppliers are extracted from the MDF. Utilizing a search algorithm via module 814, the part manufacturing requirements are compared to supplier capabilities. The user can select suppliers to search in the system from the entire worldwide database, a particular geographical region, a specific manufacturing capability, or a reduced list, possible of only one, of possible suppliers. The Integrated Produces (VIP) Supplier Capability Database 424, further defined in module 816, contains the details of each supplier's capabilities and selection algorithms. For each supplier, a list of detailed producibility considerations is generated. This includes capabilities the supplier may not possess, general producibility issues, and general sourcing considerations.

Once the raw supplier data is generated for the part, a report is generated via module 818. The report formats the data based on user selections. The report will be generated and managed in the system, as described in module 820. If desired, a regional considerations report is analyzed in module 822. This report includes regional issues for fabrication like availability of special processing capabilities, availability of knowledge workers, and sourcing alternatives. The Integrated Produces (VIP) Supplier Capability Database 424, further defined in module 816, provides the detailed supplier capabilities and the regional consideration rules. A report is generated and configured for the user via module 826.

Figure 9:
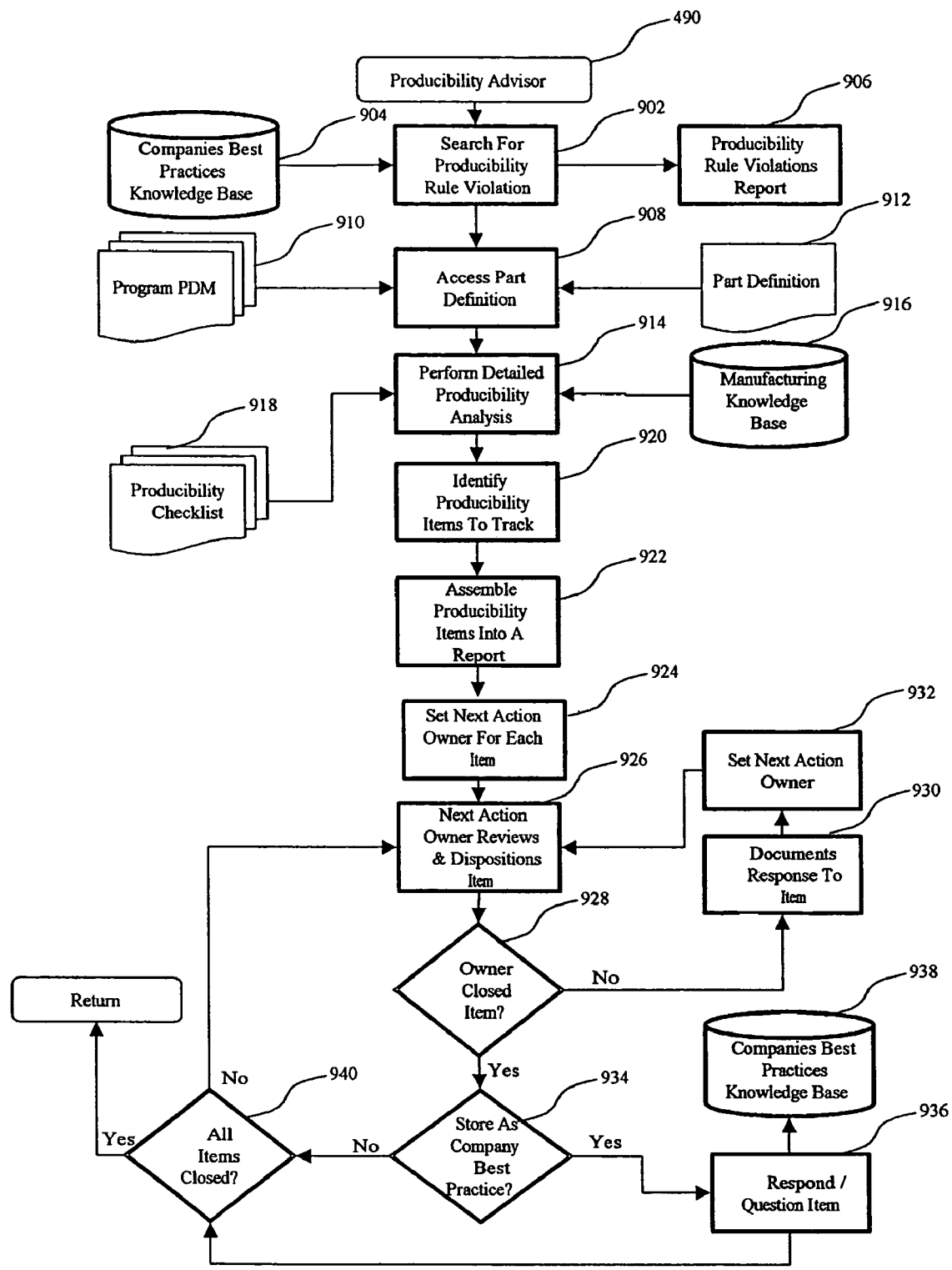
FIG. 9 depicts a schematic diagram of a producibility advisor module of the present invention.

The Producibility Advisor identifies, configures, manages, and stores manufacturing rules and knowledge from a producibility session. These producibility sessions occur between a design and one or more manufacturing experts. Given a MDF file and corresponding part attributes, the system searches for producibility rule violations in module 902, as shown in FIG. 9. This is accomplished by searching for conditions in the MDF that have similar conditions to a manufacturing rule, defined in the Companies Best Practices Knowledge Base module 904. A report is developed for the user via module 906. The report contains a list of all of the producibility violations, descriptions of the violations, ways to resolve the problems, and potential costs associated to the items.

The manufacturing producibility expert is assigned to the part via module 908. This includes instructions on how the geometry for the part can be accessed. This could also include downloading from a host server, downloading directly from a designers Program Data Management (PDM) system, as defined by module 910, or by accessing a dataset via module 912. This process can occur anytime from very early in the design phase when only preliminary solids or general part sketches exist, to final part release when detailed part definitions are available.

The manufacturing expert performs a detailed producibility review of the part in module 914. This includes using software tools and knowledge bases, as defined in module 916, and following manual checklists, defined in module 918. The manufacturing expert identifies producibility issues in module 920. This includes each items category, type, and potential cost implications. These issues contain a general description and a detailed description. The manufacturing expert enters each item into the Producibility Advisor application via module 922.

For each item, a "next action" user is added to each item in module 924. This is the party that is required to continue the item. This may include the designer, another producibility expert, purchasing, or internal manufacturing experts. When this item is set, an e-mail is sent to that person requesting them to access that producibility session to resolve a producibility issue. The "next action" user module 926 selects a link in the e-mail, and enters into the Producibility Advisor session, directly into the item in question. The user then reviews the items and develops a response.

The user has the option to close the item module 928. If the user does not close the item, a response to the item is generated and entered into the producibility Advisor application in module 930. The user also sets a new "next action" participant in module 932. If the user decides to close the item in module 928, then the user can decide whether or not to enter the decision into the companies best practice knowledge base via module 934.

In module 936, the user selects whether to enter the item in the best practices knowledge base. The user employs the Producibility Advisor application 922 to enter a description of the issue and resolution, and select key words and attributes that will be used in future retrievals of knowledge by designers. The data item is then stored in the company's best practices knowledge base in module 938.

The system manages all items identified by the manufacturing producibility expert. If all items have not been closed, as determined by module 940, the application continues to work each item. If all items have been closed for the part, the application is complete.

When issues in a producibility session cannot be resolved in the general session, a Virtual Co-location Advisor session can be established to resolve issues with many participants in real time, co-located virtually by looking at the same information on several computers.

Figure 10:
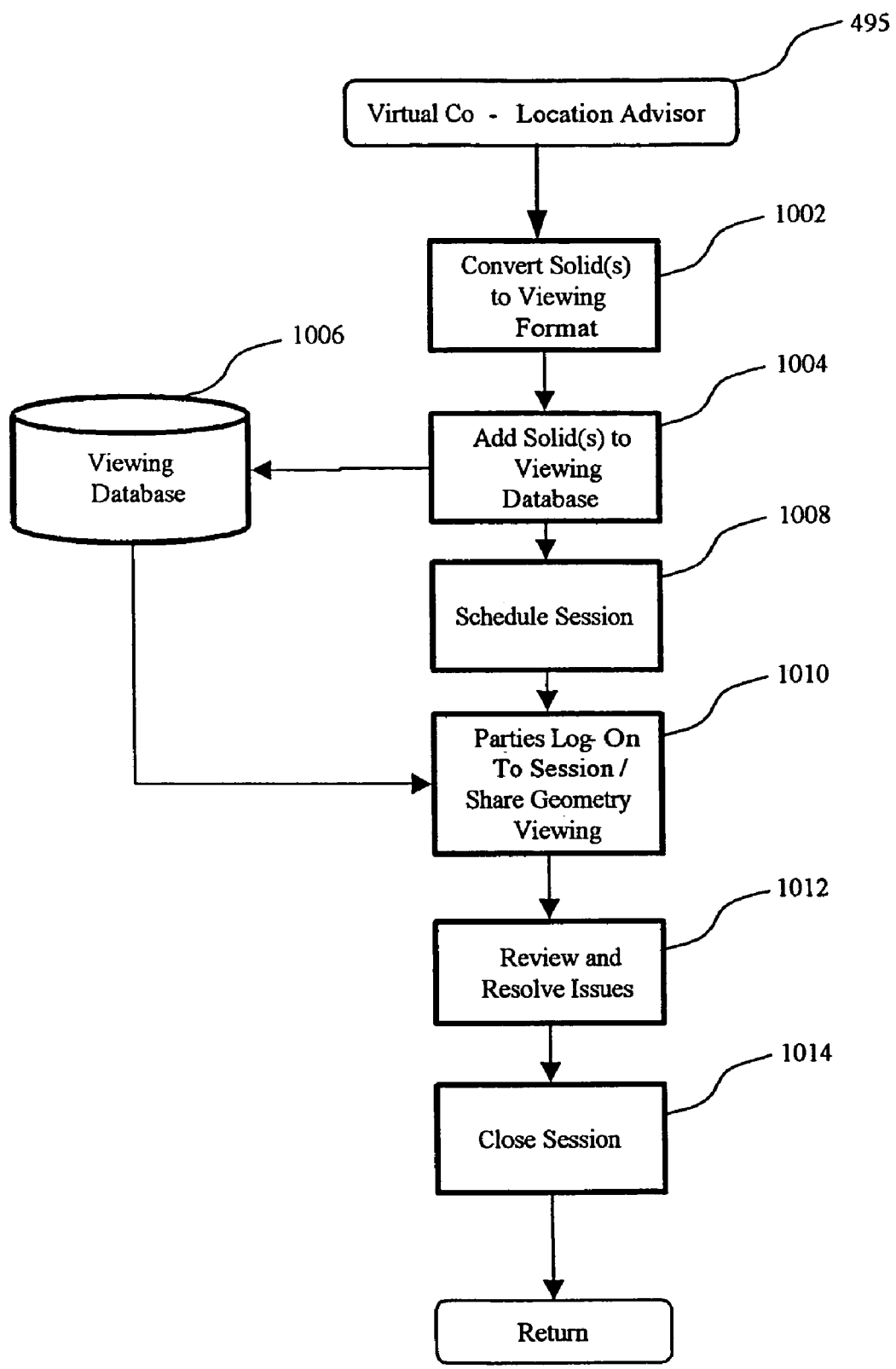
FIG. 10 depicts a schematic diagram of a virtual co-location advisor module of the present invention.

A Virtual Co-Location application (VCLA) 495 first converts all CAD system geometry, usually solid models, into what is required for the geometry viewing systems via module 1002, as shown in FIG. 10. In module 1004 the converted geometry is added to the Viewing Database module 1006. A session is scheduled with all participants via module 1008. The VCLA 495 contains scheduling tools to help participants select potential times. Every participant will either be categorized as "required", meaning the session will not occur without them, "important", where the session can continue but every effort should be exercised to include them, or "optional".

At the prescribed time, the participants log-on to the session, as provided by module 1010. Each will have access to see the geometry, the producibility reports, and the cost sessions. These sessions can also include video. This usually occurs in cases where a part is being reviewed in a shop remotely. In module 1012, the participants work each issue to a conclusion and the session is closed via module 1014.

Figure 11:
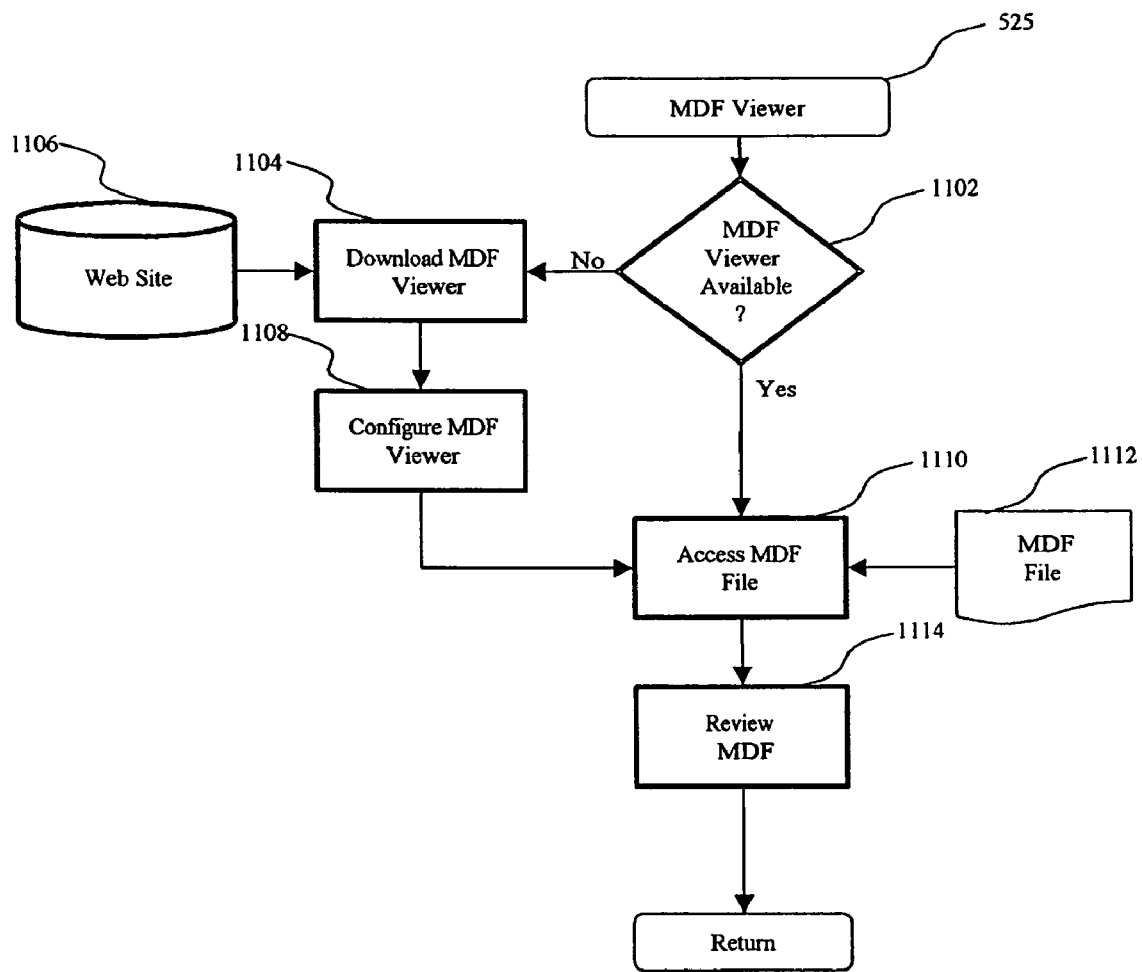
FIG. 11 depicts a schematic diagram of a meta-data file viewer module of the present invention.

The ability to view MDFs is accomplished through a MDF viewer 525. The MDF viewer is Internet enabled software that can be accessed from the host website, anywhere in the world. The viewer allows review of MDF data, but not updates or changes. It is determined via module 1102, as shown in FIG. 11, if the user does not have access to a MDF viewer, the user is prompted to download a version. Via module 1104, the user accesses the host web site and downloads an appropriate viewer. The user then configures the viewer via module 1108.

The MDF file is accessed via module 1110. This can be as an e-mail attachment, directly from the host server, or from a flat file as define by module 1112. The MDF values can then be reviewed via module 1114. The user can traverse selectable fields, review order and details of the manufacturing strategy, and understand manufacturing intent. The viewer does not allow the user to make or save updates to the MDF. Access to the MDF Advisor application is required to modify MDF data.

Figure 12:
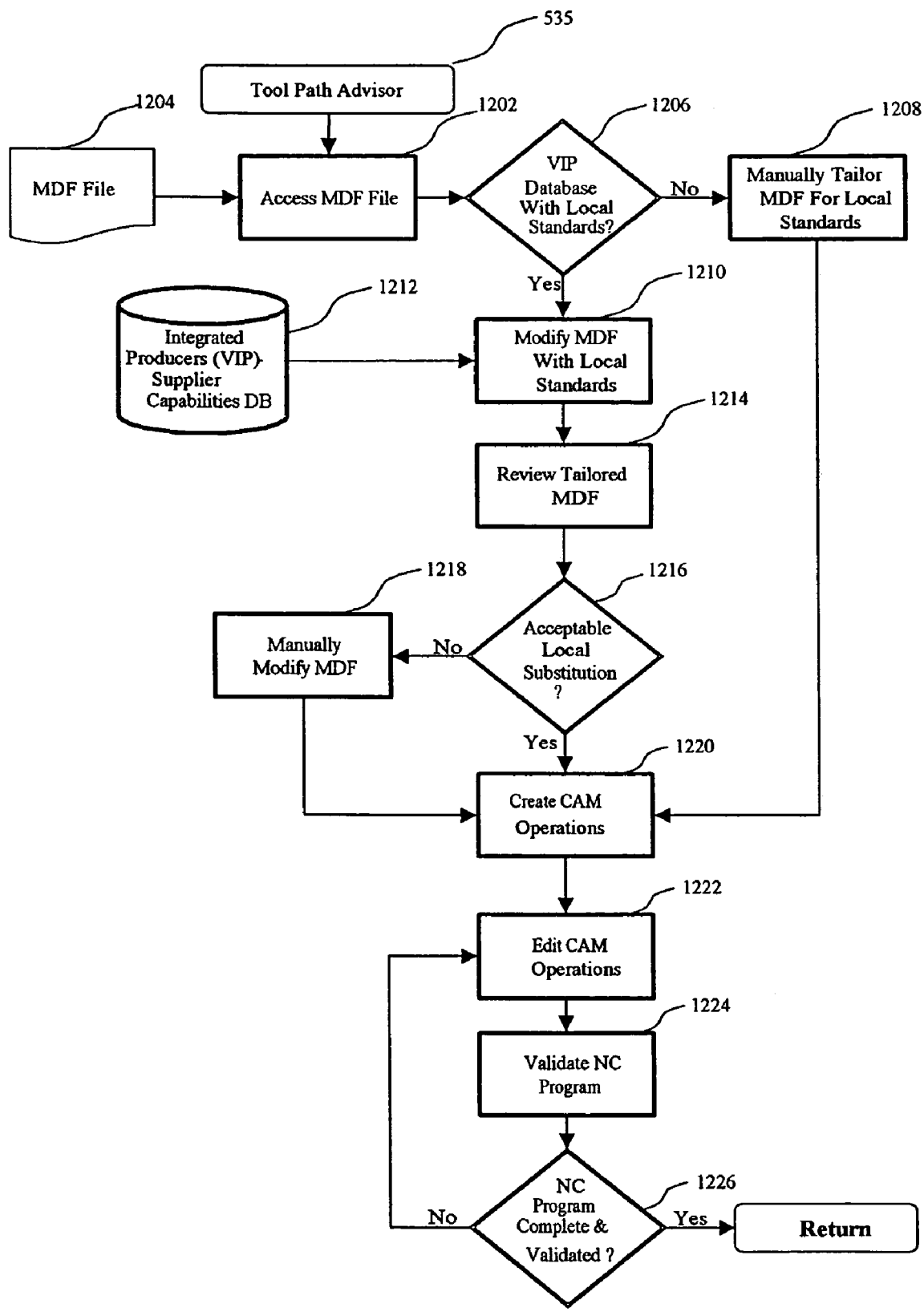
FIG. 12 depicts a schematic diagram of a tool path advisor module of the present invention.

The Tool Path Advisor application 535 tailors the MDF with a suppliers specific cutting tools, standards, and processes. The MDF is then integrated with the suppliers CAM or similar type system to create NC operations and tool path instructions, as shown in FIG. 12.

In module 1202 the MDF file is accessed and retrieved. The MDF can be in a file format, retrieved from a PDM system, retrieved from the host server, or retrieved from a local file as defined by module 1204. Module 1206 determines whether a VIP 424 database exists and whether local standards are managed. If no VIP 424 database exists, then the MDF Advisor application is tailored in module 1208. This includes defining local cutters and entering shop standard information. If an integrated VIP database exists, then the system automatically integrates shop standards into the MDF via module 1210. Local standards and cutting tools are retrieved from the Integrated Producers (VIP) 424 byway of module 1212.

The Tailored MDF is reviewed by the user in module 1214. If the local substitution is not acceptable in module 1216, the user can manually modify the MDF using the MDF Advisor application module 1218. When the MDF is acceptable, the CAM operations are created in module 1220. The process for creating CAM operations will vary depending upon the suppliers particular CAM system. The user can edit and complete the NC program using the native CAM system interface module 1222. The user then validates the NC program in the preferred tool path and machine simulation software in module 1224.

When the NC program is completed and validated module 1226, the process is complete. If not, the user edits and revalidates the NC program.

Figure 13:
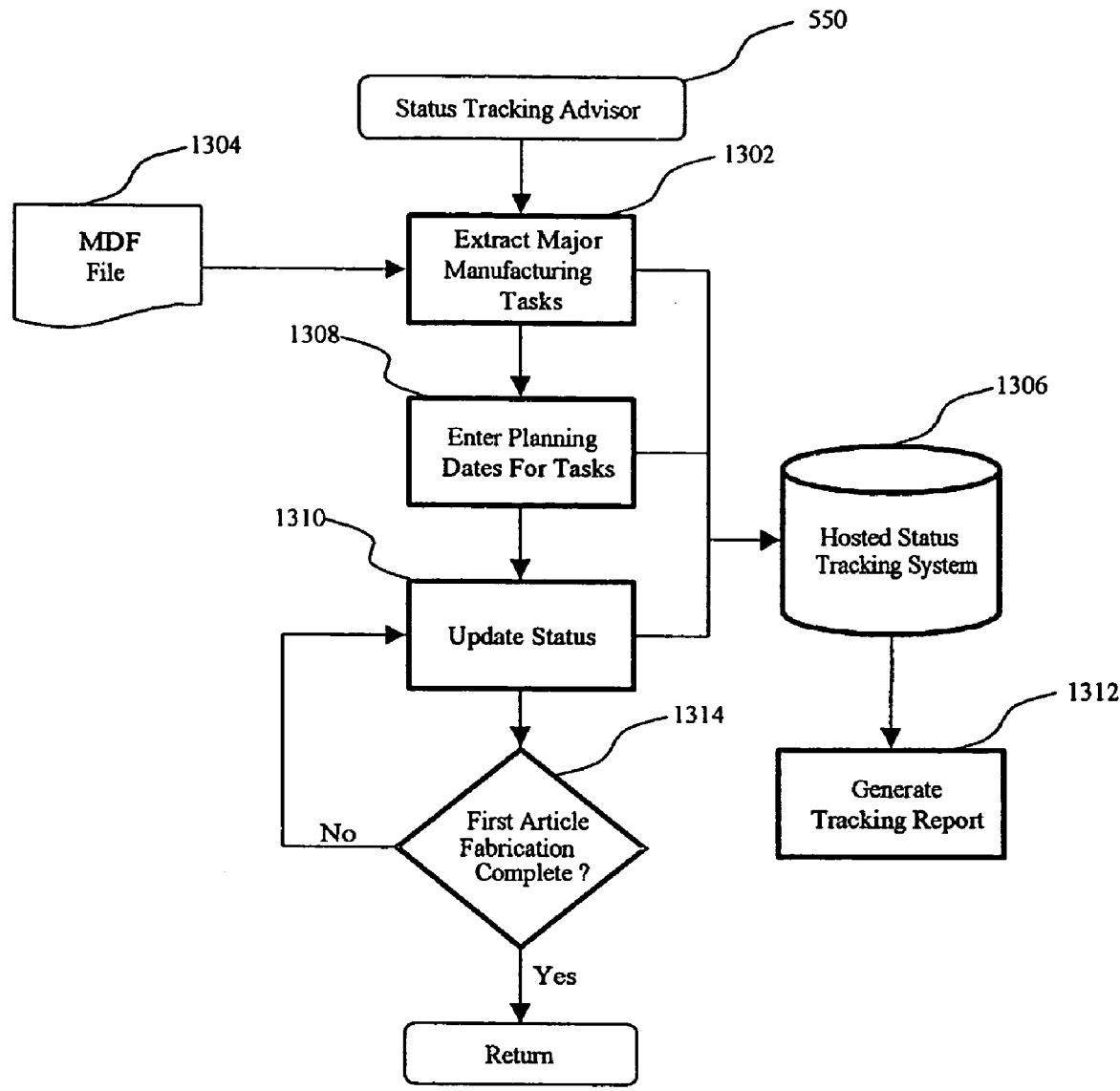
FIG. 13 depicts a schematic diagram of a status tracking advisor module of the present invention.

The major manufacturing tasks are retrieved, in module 1302, from the MDF, defined in module 1304, as shown in FIG. 13. Major manufacturing tasks include NC setups, CMM operations, and post processing operations. Each task is integrated into a high level schedule managed on host server module 1306.

The user, via module 1308, enters planning dates for each of the items. This includes planned start dates, planned end dates, actual start dates, and actual end dates. The user then updates the current status bar in module 1310 on the host system. In module 1312 status tracking reports can be generated for a part or a group of parts. This can be configured to create exception reports based on certain items being late.

In module 1314, if the part is complete and the status tracking items are closed, the process is complete. If not, the user continues to update status the progress module 1310 until the process is complete.

The reader should note that the processes described above can be started and stop and revisited numerous times until the final product is produced. Since design parameters as well as manufactures and equipment specifications change over time, the present invention provides a unique and cost efficient way of managing these complex issues without having to resort to rewriting potentially 10's of thousands of lines of CAD, CAM and NC machine language code to effectuate relatively minor changes.

It will be apparent to those skilled in the art that various modifications and variations can be made in the Method For Capturing, Managing, and Disseminating Manufacturing Knowledge of the present invention and in construction of this invention without departing from the scope or intent of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A memory for storing data for access by an application program executable on a data processing system, comprising:

a data structure for configuring manufacturing knowledge and expertise in designing and fabricating an object for manufacture, the data structure stored in said memory, said data structure including information resident in a database used by said application program and including:

a part level strategy section, the part level strategy section defines general part level attributes and requirements for manufacturing an object; a numerical control setup section, wherein the numerical control setup section defines object fabrication activities for the object set up on a numerical control machine;

a quality assurance section, wherein the quality assurance section defines numerical control machine setup;

a post operation section, wherein the post operation section defines non-machine tolling functions for manufacturing the object; and a manual operation section, wherein the manual operation section defines attributes of non-Numerical Control machine driven operations.

2. The memory for storing data for access by an application program being executed on a data processing system of claim 1, wherein the data structure further including at least one of:

a cutting tool assembly definition section, wherein the cutting tool assembly definition section defines parameters and settings for a tool used in manufacturing the object;

a numerical control action section, wherein the numerical control action section defines numerical control material removal operations; and a quality assurance action section, wherein the quality control action section defines manual inspection activities for a numerical control machine setup.

* * * * *

UNITED STATES PATENT AND TRADEMARK OFFICE
CERTIFICATE OF CORRECTION

| | | |
|---|---|---|
| PATENT NO. | : 7,010,544 B2 | |
| APPLICATION NO. | : 10/953809 | |
| DATED | : March 7, 2006 | |
| INVENTOR(S) | : Todd Alan Wallen et al. | |

It is certified that error appears in the above-identified patent and that said Letters Patent is hereby corrected as shown below:

In column 3, line 64, after "perform" delete "and" and insert -- an --, therefor.

In column 4, line 52, after "capable" insert -- of --.

In column 5, line 12, after "capable" insert -- of --.

In column 5, line 28, after "and" delete "storing" and insert -- store --, therefor.

In column 5, line 31, after "and" delete "accesses" and insert -- access --, therefor.

In column 5, line 35, after "and" delete "manufacturing" and insert -- manufacture --, therefor.

In column 6, line 48, after "file" delete "is" and insert -- are --, therefor.

In column 6, line 51, after "and" delete "storing" and insert -- store --, therefor.

In column 7, line 23, after "capable" insert -- of --.

In column 7, line 49, after "capable" insert -- of --.

In column 7, line 64, before "to" delete "storing" and insert -- store --, therefor.

In column 8, line 4, after "and" delete "the".

In column 8, line 17, after "before" delete "and" and insert -- an --, therefor.

In column 8, line 22, after "and" delete "storing" and insert -- store --, therefor.

In column 10, line 17, after "dimensions" insert -- , --.

In column 10, line 24, after "breaking" insert -- it --.

In column 10, line 30, after "altered" insert -- , --.

In column 10, line 40, after "database" insert -- , --.

In column 11, line 19, before "Section" delete "The" and insert -- This --, therefor.

UNITED STATES PATENT AND TRADEMARK OFFICE
CERTIFICATE OF CORRECTION

PATENT NO.      : 7,010,544 B2
APPLICATION NO. : 10/953809
DATED           : March 7, 2006
INVENTOR(S)     : Todd Alan Wallen et al.

It is certified that error appears in the above-identified patent and that said Letters Patent is hereby corrected as shown below:

In column 11, line 29, after "via" delete "an" and insert -- a --, therefor.

In column 12, line 54, after "pockets" delete "are" and insert -- is --, therefor.

In column 13, line 54, after "communications" delete "network" and insert -- networks --, therefor.

In column 14, line 3, after "424" delete ",".

In column 14, line 18, after "the" delete "suppliers" and insert -- supplier's --, therefor.

In column 14, line 22, before "MDF" delete "An" and insert -- A --, therefor.

In column 15, line 6, before "peening" delete "shoot" and insert -- shot --, therefor.

In column 16, line 48, before "(VIP)" delete "Produces" and insert -- Producers --, therefor.

In column 16, line 63, before "(VIP)" delete "Produces" and insert -- Producers --, therefor.

In column 17, line 51, before "best" delete "companies" and insert -- company's --, therefor.

In column 18, line 42, before "specific" delete "suppliers" and insert -- supplier's --, therefor.

In column 18, line 65, before "particular" delete "suppliers" and insert -- supplier's --, therefor.

In column 19, line 3, before "module" insert -- via --.

In column 19, line 25, before "and" delete "stop" and insert -- stopped --, therefor.

In column 19, line 27, before "and" delete "manufactures" and insert -- manufacture --, therefor.

UNITED STATES PATENT AND TRADEMARK OFFICE
CERTIFICATE OF CORRECTION

| | |
|---|---|
| PATENT NO. | : 7,010,544 B2 |
| APPLICATION NO. | : 10/953809 |
| DATED | : March 7, 2006 |
| INVENTOR(S) | : Todd Alan Wallen et al. |

It is certified that error appears in the above-identified patent and that said Letters Patent is hereby corrected as shown below:

In column 19, line 34, after "Method" delete "For" and insert -- for --, therefor.

Signed and Sealed this

Twenty-third Day of September, 2008

JON W. DUDAS
*Director of the United States Patent and Trademark Office*